(12) United States Patent
Zuercher

(10) Patent No.: US 9,279,897 B2
(45) Date of Patent: *Mar. 8, 2016

(54) LOCATING OIL OR GAS PASSIVELY BY OBSERVING A POROUS OIL AND GAS SATURATED SYSTEM GIVING OFF ITS CHARACTERISTIC RESONANCE RESPONSE TO AMBIENT BACKGROUND NOISE, INCLUDING OPTIONAL DIFFERENTIATION OF OIL, LOCATINGGAS AND WATER

(75) Inventor: Hannes Georges Zuercher, Sunnyvale, CA (US)

(73) Assignee: Hannes Zuercher, Sunnyvale, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/608,155

(22) Filed: Dec. 7, 2006

(65) Prior Publication Data

US 2010/0036614 A1    Feb. 11, 2010

Related U.S. Application Data

(60) Provisional application No. 60/597,582, filed on Dec. 12, 2005.

(51) Int. Cl.
| | | |
|---|---|---|
| G01N 15/08 | (2006.01) |
| G01V 1/00 | (2006.01) |
| G01N 1/28 | (2006.01) |
| G01V 1/28 | (2006.01) |
| G01V 1/32 | (2006.01) |

(52) U.S. Cl.
CPC *G01V 1/288* (2013.01); *G01V 1/32* (2013.01); *G01V 2210/63* (2013.01); *G01V 2210/65* (2013.01)

(58) Field of Classification Search
CPC ......... G01V 1/28; G01V 11/00; G01V 1/003; G01V 1/30; G01V 1/288; G01V 1/364; G01V 1/3808; G01V 3/12; G01V 2210/65
USPC ............... 702/12, 14, 17, 18, 48, 54, 143, 13; 367/14, 18
See application file for complete search history.

(56) References Cited

U.S. PATENT DOCUMENTS

| | | | | |
|---|---|---|---|---|
| 5,359,541 A | * | 10/1994 | Pope et al. .................. 702/25 |
| 5,715,213 A | * | 2/1998 | Allen ............................ 367/48 |
| 5,721,710 A | * | 2/1998 | Sallas et al. .................. 367/41 |
| 6,473,695 B1 | * | 10/2002 | Chutov et al. ................. 702/2 |

(Continued)

FOREIGN PATENT DOCUMENTS

GB    2473607    *    3/2011

*Primary Examiner* — Michael Nghiem

(57) ABSTRACT

This patent deals with methods to extract and analyze seismic signals due to resonance phenomena in an enclosed oil, gas, or water reservoir, which are passively excited by seismic background noise, locating thereby the presence of the reservoir by doing qualitative and quantitative estimates via forward modeling. Measurements are first used in a qualitative analysis in eight steps. The influence of gas bubbles is important. A quantitative method in form of a numerical simulation using one of several specific physical concepts is used for further analysis. By using successive forward modeling, together with investigation and feedback and in conjunction with the Monte Carlo method, more details are gained. It is also possible to determine the fluid type. The uniqueness of the methods is first that it is purely passive; second it is directly sensitive to the oil or gas, because the resonance effect is only present for a fluid.

11 Claims, 10 Drawing Sheets

(56) References Cited

Figure 1:
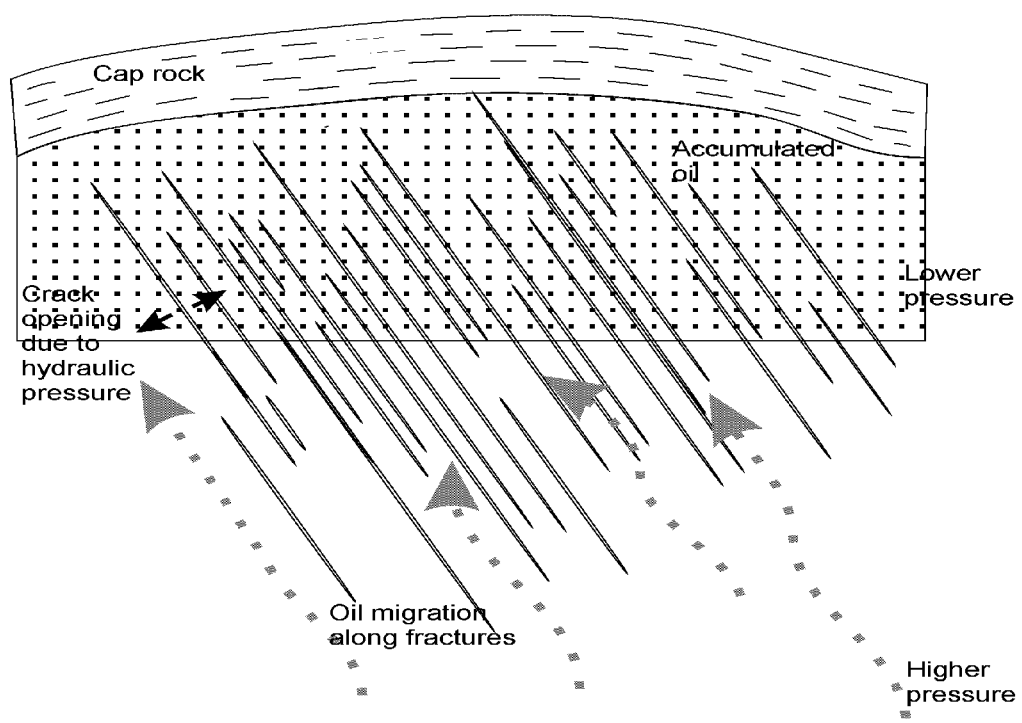

U.S. PATENT DOCUMENTS 7,676,326 B2 * 3/2010 Podladchikov et al. ........ 702/11
9,176,243 B2 * 11/2015 Zuercher .................. G01V 1/28
2002/0191490 A1 * 12/2002 Meunier ....................... 367/140
2008/0002523 A1 * 1/2008 Podladchikov et al. ........ 367/49
2010/0027377 A1 * 2/2010 Zuercher ......................... 367/73

* cited by examiner $$p[\omega_e, \xi] = p_e \sum_{n=0}^{\infty} \frac{1}{\left(e^{\frac{l\omega_0}{2Qc_0}}\right)^{2n}} \left| \frac{1}{\left(e^{\frac{l\omega_0}{2Qc_0}}\right)} \operatorname{Sin}[(\omega_e l/c_0) 2n + \omega_e l/c_0 + \xi] - \operatorname{Sin}[(\omega_e l/c_0) 2n + \omega_e l/c + \xi] + \ldots \right|$$

$$p[\omega_e, \xi]/p_e =$$

$$\frac{\dot{n} \, e^{\frac{l\omega_0}{c_0 Q}} \left(-1 + e^{\frac{4\dot{n}l\omega_e}{c_0}}\right) \operatorname{Cos}[\xi] \operatorname{Cos}\left[\frac{l\omega_e}{c}\right]}{2 \left(e^{\frac{l\omega_0}{c_0 Q}} - e^{\frac{2\dot{n}l\omega_e}{c_0}}\right) \left(-1 + e^{\frac{l\omega_0}{c_0 Q} + \frac{2\dot{n}l\omega_e}{c_0}}\right)} - \frac{\dot{n} \, e^{\frac{l\omega_0}{2c_0 Q}} \left(-1 + e^{\frac{4\dot{n}l\omega_e}{c_0}}\right) \operatorname{Cos}[\xi] \operatorname{Cos}\left[\frac{l\omega_e}{c_0}\right]}{2 \left(e^{\frac{l\omega_0}{c_0 Q}} - e^{\frac{2\dot{n}l\omega_e}{c_0}}\right) \left(-1 + e^{\frac{l\omega_0}{c_0 Q} + \frac{2\dot{n}l\omega_e}{c_0}}\right)} +$$

$$\left(e^{\frac{l\omega_0}{2c_0 Q}} \left(1 - 3 e^{\frac{l\omega_0}{c_0 Q}} + 2 e^{\frac{2\dot{n}l\omega_e}{c_0}} + e^{\frac{4\dot{n}l\omega_e}{c_0}} - 2 e^{\frac{l\omega_0}{c_0 Q} + \frac{2\dot{n}l\omega_e}{c_0}} + 4 e^{\frac{2l\omega_0}{c_0 Q} + \frac{2\dot{n}l\omega_e}{c_0}} - 3 e^{\frac{l\omega_0}{c_0 Q} + \frac{4\dot{n}l\omega_e}{c_0}}\right)\right).$$

$$\operatorname{Sin}[\xi] \operatorname{Sin}\left[\frac{l\omega_e}{c}\right] \operatorname{Sin}\left[\frac{l\omega_e}{c_0}\right] \Big/ \left(4 \left(-1 + e^{\frac{l\omega_0}{c_0 Q}}\right) \left(e^{\frac{l\omega_0}{c_0 Q}} - e^{\frac{2\dot{n}l\omega_e}{c_0}}\right) \left(-1 + e^{\frac{l\omega_0}{c_0 Q} + \frac{2\dot{n}l\omega_e}{c_0}}\right)\right)$$

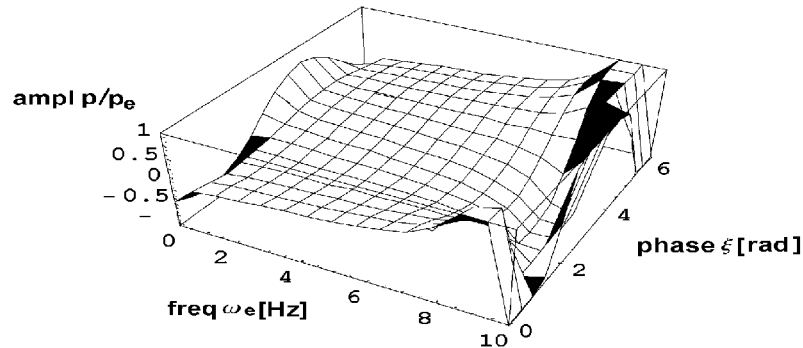

Figure 5

LOCATING OIL OR GAS PASSIVELY BY OBSERVING A POROUS OIL AND GAS SATURATED SYSTEM GIVING OFF ITS CHARACTERISTIC RESONANCE RESPONSE TO AMBIENT BACKGROUND NOISE, INCLUDING OPTIONAL DIFFERENTIATION OF OIL, LOCATINGGAS AND WATER

Priority is claimed hereby to provisional application 60/597,582.

INTRODUCTION

Oscillation phenomena are abundant in seismology. Anytime we have materials together with dissimilar impedance, and some kind of enclosure is formed, there is a likely-hood of resonance in this system. A typical example is e.g. a valley in bedrock, where the free surface acts like an upper enclosure. Waves in this valley get trapped and lead to amplified behavior at the resonance frequency.

This principle has been applied successfully may times. Nakamura's work is famous for using polarized shear waves (Nakamura, Clear Identification of Fundamental Idea of Nakamura's Technique and its Application, World Conf. Earthquake Eng. 2000, paper 2656), as well as others working with surface waves (e.g. Bard and Bouchon, The two-dimensional resonance of sediment-filled valleys, Bulletin Seismol. Soc. Am. 70, p. 519-561). The key items used in this analysis the H/V ratio of motion; it can be used to identify the resonance. It can be interpreted as the first peak of Raleigh waves in case of surface waves.

We are interested here however in the behavior of fluid saturated rocks and how this differs from plane dry rock. The most common fluid observed is water, which is abundant. Other common observed fluids are observed around volcanoes. Let us look closer at 3 cases and then look at the general situation. We then extrapolate results to fluids like oil and gas, to which resulting observation apply equally well.

It has been known for a long time that water saturated materials respond very strongly to shaking by "liquefaction", this especially in a frequency range of 1-10 Hz critical for building response. This usually causes very strong earthquake damage, often a large distance away from the earthquake. Two instances suffice: The Mexico City 1985 Earthquake, which was >550 km away from the city. Mexico City sits on highly porous lake-beds up to 800 m thick, totally water saturated. 100'000 buildings were destroyed. At that distance an earthquake normally is harmless. The Loma Prieta Earthquake near San Francisco in 1989 is yet another example, where the biggest damage occurred 70 km away, yet the author's home survived without any damage only 30 km away. An elevated freeway totally collapsed in itself due to the strong shaking, creating horrendous damage and putting that section of the freeway out of commission for years. The signal at this site was 100 times the size of the signal in bedrock at the same distance.

Liquefaction can be thought of the resonance behavior of fluid saturated low consolidated materials. While better consolidated fluid saturated rocks are less likely to liquefy, they nevertheless can to some degree display similar shaking characteristics like their unconsolidated counterparts: they do resonate, and behave different from "dry" rock.

While making measurement in a Swiss valley in the Alps, a tractor was fertilizing fields. The truck literally set the ground in motion; signals were as strong 150 m away as the tractor drove by the instrument on the gravel road. The farmer noted that in rainy years when picking potatoes in the field you could feel the vibrations from the tractor quite some distance away. The analysis of the signal showed a clear sinusoidal signal of 4 Hz.

Oscillation phenomena are observed in the same frequency range of 1-10 Hz in volcanoes. There the seismic signals here are called tremors, which are of several types. Of these short tremors (often called LP events), and ongoing tremors (hours duration) are of particular interest. They represent a resonance phenomenon, which seems to occur in what is interpreted as large, fluid filled crack systems in volcanoes. The fluid can be water, magma, gas, and/or all of these containing particles of solid material. Resonance occurs in form of interface waves between the crack and the fluid. This resonance manifests itself in a noticeable spike in the spectrum of seismic signals, most often in the range of 3-5 Hz. Correspondingly the LP events typically consist of nice decaying harmonic oscillations. The cracks are of the size of up to kilometers and have small aspect ratios of 1:1000 to 1:10'000, which means the crack opens only a small amount, at most a few centimeters to a meter. A good reference is the work of Bernard Chouet, e.g. 1996.

Cracks are well known to be abundant in rocks, of all kind and sizes, though usually not readily apparent. Good examples of crack distributions are found e.g. in the "Maze" in Canyon Lands National Park, which both on ground and from the air allows to recognize a well exposed system of cracks, visible due to the erosion in that particular weakly cemented sandstone formation. Another good example is the Buck Skin Gulch, the narrowest slot canyon of the world, which can be walked trough. Here a creek took advantage of a crack system to cut trough very tough rock, jumping from crack to crack.

Cracks are usually several closely spaced together and roughly 200-500 m long. Due to erosion the crack system is made highly visible. This site is located near Kanab in southern Utah.

Application to Oil Fields

Here we apply resonance due to cracks and liquefaction to oil and gas fields.

Usually crack systems are not thought to be open, so that fluids could circulate through them. In a water or oil saturated porous medium however it is likely to have cracks open up, due to stress distributions of the interaction with oil, water and gas (and combinations) in the rock. For instance oil generally migrates to shallower rock depths due to the higher pressure at depth and the fact that the rock is porous and fractured. As sediments accumulate on top, the overburden and with that the ambient pressure at depth increases and compresses the pore space. The pressure in the fluid increases beyond the hydrostatic pressure. The oil is squeezed out; its path establishes essentially a hydraulic conduit. This migration occurs till it encounters an impermeable layer or trap. Hence cracks can open up due to the higher than hydrostatic pressure of the oil, water or gas in the conduit.

FIG. 1 shows such a system of cracks potentially present in an oil field with a cap layer on top.

Resonance in a system depends on two items:

First, the impedance differs in materials. Either of water, oil or gas have a large impedance difference to rock. Acoustic impedance is defined as the product of acoustic speed V and the density $\rho$ of the fluid. For a typical rock, this ratio is of the order of 6-8 for water-oil and around 80 k for gas. These ratios are quite a bit larger than even large impedance difference in rocks, which are at best of the order of 3.5. Hence we will not be surprised to observe clear resonance effects for fluids. Resonance of fluid as observed for volcanic "conduit" systems (the conduits were found to almost always be actually crack systems) will be expected to abound in oil fields as well.

Second, excitement energy is needed. In volcanic systems this is provided by the heat and pressure generated by the intruding magma. In oil fields this is more complex, we either have to provide it artificially, or use micro tremor and industrial noise already present in the earth. Clearly very sensitive instruments are needed. Micro tremor or random noise is useful only if it contains energy in the frequency range of the linear oscillator to be excited. In that sense it is difficult, if the excitement range is located where the micro tremor is weak, and other areas of the micro tremor are strong, resulting in hiding resonance. Sophisticated filtering techniques must be used to extract the resonance part.

Figure 2:
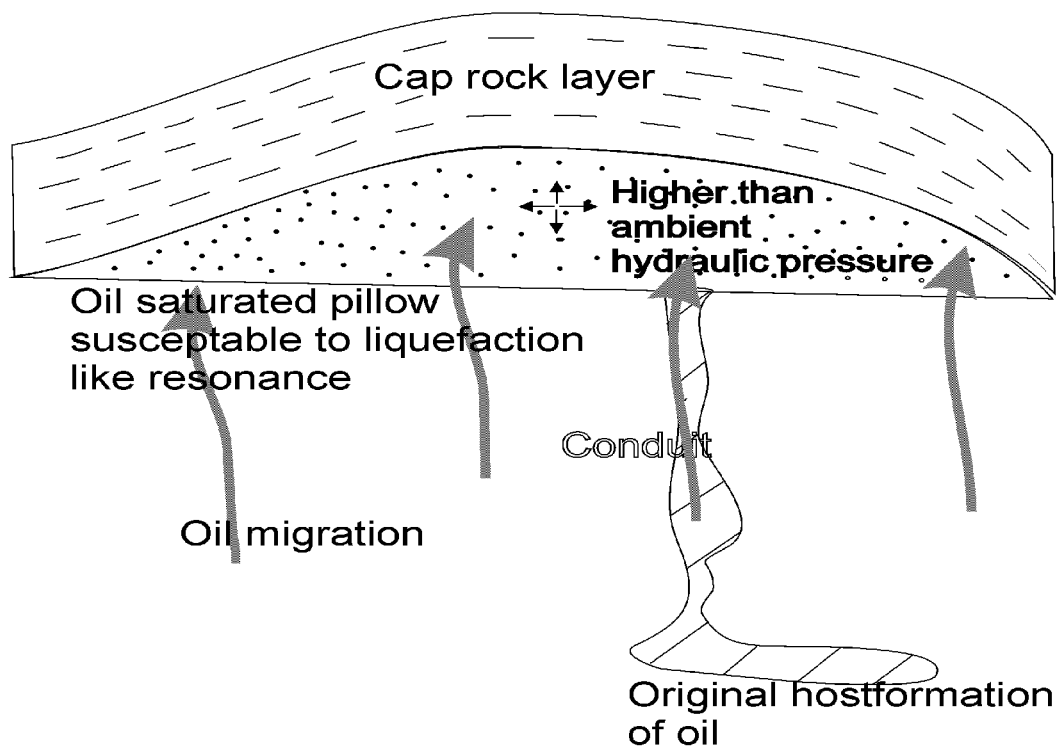

The case of "liquefaction" can be interpreted in oil exploration as a fluid filled sponge, the sponge consisting of the porous media filled with oil, instead of the water saturated unconsolidated rocks near the surface. This is represented in FIG. 2. Overpressure in the fluid for reasons stated above leads to that the oil is carrying effectively part of the ambient load. This is analog to the fluid saturated unconsolidated sediments, where water carries a good part of the load, because of weak nature of the sediment material. Large amplification of waves as observed in water saturated surface layers during earthquakes is likely to occur in such oil pillows, at least to some degree.

The sponge described above is contained by solid rock on all sides, in the overall shape of a very large "pillow". Such sponges represent a zone of high impedance within higher impedance and therefore resonate. In the limit of a very thin "pillow" we have a fluid filled crack filled with oil and particles. The surrounding media in the case of the pillow is equivalent to the walls of the crack. A model will be constructed to investigate the behavior of the sponge in detail, but it is expected overall to be similar to other resonance structures.

In porous media another effect will have a significant influence: the presence of bubbles. In engineering, bubble clouds in water have been investigated in detail. It was found they remarkably influence the physical properties (Van Wijngaarden, One-dimensional flow of liquids containing small gas bubbles, Annu. Rev. Fluid Mech. 4, pp 369-396, 1972). Even 1% bubbles reduce the acoustic speed down to 0.5 km/sec from 1.5 km/sec. Bubble clouds tend to resonate also. Even though bubbles by themselves resonate in the kHz range, a bubble cloud of 1 m layer will resonate at 57 Hz.

For oil a gas component is ubiquitous. Often time there is a free gas phase present above oil, meaning that the oil is saturated with gas. Hence bubbles are very likely. The porous container also means that there are many condensation points present, so small pressure and temperature variation lead easily to bubbles (e.g. earth tides). Because of porosity and gas saturation, bubbles will persist a long time.

This is confirmed by oil exploration data (e.g. Anstey, Seismic Interpretation: The Physical Aspects, International Human Resources Development Corporation, 1977). So called water saturated gas sand e.g. has a very low velocity, even for water saturation close to 100%. A minimum velocity value below that either of pure gas sand or water sand occurs close to water saturation (94%), where gas is expected to be present in bubbles. This proves the strong effect of bubbles in water and oil in oil reservoirs. Hence for bubbles present, the impedance contrast is strongly enhanced, making sponges more conspicuous.

Signals very similar to volcanic tremors have been observed above oil fields, but of very low magnitude, typical in the range of a few Hz. Signals found were generally much smaller in quiet areas than noisy places, suggesting that background noise is a likely potential source of excitation of this signal. Just like liquefaction amplifies the strong motion during the earthquake, a pillow of oil saturated ground amplifies the seismic background noise—or any kind of signals passing through them—, and imprints on them the resonance characteristics of the fluid system contained in the rock. Note that the typical damaging oscillations found in liquefaction (1-10 Hz) are exactly in the range of such signals actually observed above oil reservoirs (3-5 Hz).

To differentiate between pure rock structures and fluid saturated zones, we can use polarization. Waves in fluid areas are of the p wave type (un-polarized), while in solid shear waves are present. Hence we can use the H/V ratio technique or Raleigh wave analysis (using fundamental frequencies) to sort out areas where resonance resulted from rock only impedance differences.

PRIOR ART WORK

There are Russian patent(s), at this time not identified, dealing with the consequences of the phenomenon described here however in a different way, related more to standard exploration techniques and a totally different scientific explanation, if any. Therefore the methods in this patent are intrinsically different.

The most closely related patent is U.S. Pat. No. 6,473,695: Method for direct hydrocarbon reservoir detection and delineation by low frequency acoustic spectroscopy. The patent deals with the phenomenon on a heuristic basis; we argue that some of the conclusions regarding differentiation of water and hydrocarbon windows are wrong. The present patent differs from U.S. Pat. No. 6,473,695 in that the methods, being specific to a physical explanation of the phenomenon, are explicit instead of general as in U.S. Pat. No. 6,473,695, and are going much more in detail in resolution.

SUMMARY OF INVENTION

This patent deals with the passive observation of the resonance phenomena associated with fluid saturated areas in the earth, either in form of fractures (second order porosity) or in form of a fluid filled sponge.

There are several ways to approach this problem in this patent, but the first step is to make measurements.

1. Measurements

Measurements using ambient noise require low bandwidth instruments with high sensitivity. Ideal are instruments, which are linear in the range of 01.Hz-20 Hz. These are usually velocity sensors. Highly sensitive accelerometers have been tested also and found marginally sufficient.

The distance between measurements should be large enough that significant differences are seen, but small enough, that typical waves can be resolved (Wave length $\lambda=c/v$, where c=velocity, v=frequency). E.g. if one is interested in a frequency of 5 Hz, the array length should be smaller than 3/5 km. This allows to use seismic arrays (see below), in which several instruments are used together, time synchronized.

The measurement can be arranged in a regular grid or in form of a profile. Course resolution can be used initially, then concentrate on areas of interest in detailed resolution.

2. Corrections to Measurements

Seismic signal strength strongly correlates with the surface geology and topography, variations can be easily to 4 fold. Therefore we need to correct the signal accordingly.

1. The surface layer can be estimated by surface inspection (usually holes are needed to eliminated wind influence), a hammer experiment. We can use a cheap accelerometer with appropriate shunt in parallel, locate it at a distance 10-15 m and use a hammer blow to a metal plate to generate the signal. The regular sensitive instrument then records the arrival. From the first arrival a reasonable value of the surface rock can be obtained, and used for a correlation factor. The impedance ratio can be used for correction.

2. Topographic corrections need to be applied at abrupt changes in slope. Use known effects from calculation for corrections.

Geology could be important, if it changes significantly over the survey area. Once area might be covered with another rock type, leading to entirely different behavior which needs to be corrected. Again the impedance ration can be used for correction.

Noise source correction are needed, if know sources are relatively close to one area and more distant to other areas. Usually this is industrial type noise.

Time variation may need to be corrected, for diurnal noise, or for tidal influences (noted e.g. in Volcanology).

3. Qualitative Analysis

The following sections describe the qualitative analysis methodology.

3.1 Overall Analysis

To analyze the signal for its overall properties the Fourier transform is used. This calculates the individual contributions to the signal without any assumption of what contributed it. We can determine the noticeable average frequencies standing out and their amplitudes as well as phase over the entire time range of the measurement. By mapping one or all of these results areas of strong signal can be located. Here by the extension of these areas can be estimated, length and width.

The general velocity structure of the area can be obtained as well from all measurements used in conjunction. It assumes the signals as stochastic in nature, despite that the measurement usually occur consecutive, and not simultaneously. For this one determines the spatial correlation function between all measurements. Via the following equation for vertical displacement one obtains the velocity c as a function of frequency $\omega$, the dispersion curve. The equation is for the Raleigh waves (vertical component), a similar equation holds for horizontal (Love) waves $$<\varrho(\omega,r)>=J_0[\omega/(c(\omega)\cdot r)]$$

where $\varrho$ the correlation coefficient, $<>$ averaged over all azimuths, $J_0[\ ]$ Bessel function of order 0

$\omega$ the frequency c the phase velocity r the radial distance from station.

(The correlation coefficient is the correlation relative to the correlation at radius 0).

The dispersion curve can be inverted to a velocity c as a function of depth z, c (z), by assuming that the dispersion curve represent the dispersion of fundamental modes of Raleigh and Love waves (e.g. Chouet et al. Shallow velocity structure of Stromboli Volcano, Bull. Seismol. Soc. America, 88, pp 653-666). This assumes that the bulk of the seismic signal is made up of surface waves.

3.2 Exclusion of Oscillations Due to Rock-Only Structures

Changes in rock impedance with depth alone without any presence of fluids can also lead to oscillations, but these oscillations involve shear waves. These oscillations can be identified by the H/V ratio, which is the ratio of the horizontal and vertical components of the measurements, following the Nakamura method (Nakamura, 2000, Proc., XII World Conf. of Earthquake Engineering, New Zeeland, Paper no 2656). One looks for maxima in the frequency spectrum of the H/V ratio, in the same frequency range we are interested in. It is a result of oscillations caused by either horizontal shear waves or by the fundamental surface wave mode. Once identified, such frequencies are then excluded from further examination, since they have nothing in common with fluid caused effects. The exclusion can be implemented by a filter if needed. Examples causing such effects are the soft layer on top due to weathering, valley fills or simple geological layering further down in the earth. Since these always show a clear H/V ratio different form 1, they can be identified and excluded.

3.3 Time Variation Analysis of Signal

We look at time variation analysis with the purpose is to obtain information about potential oscillators out from the noise of the recorded signal. Seismic noise can be characterized as a regular background noise, often Brownian in nature. Oscillators set themselves apart from this noise by consistent frequency content over some period of time.

Superimposed are strong local noise sources as wind gusts, traffic, animals and industrial sources. Most sporadic high noise is usually excluded by not being considered. To obtain the general characteristics of the noise itself it is best to get a reference outside the suspected fluid area nearby, which should be used as a basis for this assessment.

For the time variation of the signal a moving or shifted time window of appropriate size is used, so that a sufficient number of resonance oscillations are analyzed to give meaningful analysis values. The window should be small enough, so that over the time of the measurement significant variations can be detected. A good value is 3 sec. For values >30 sec the signal is stochastic in time, no time variations are seen. The shift or moving of the window along the time axis is a fraction of its size, large enough that variations after a shift are noticed. For each of the windows the Fourier spectrum of the signal is determined.

Figure 6:
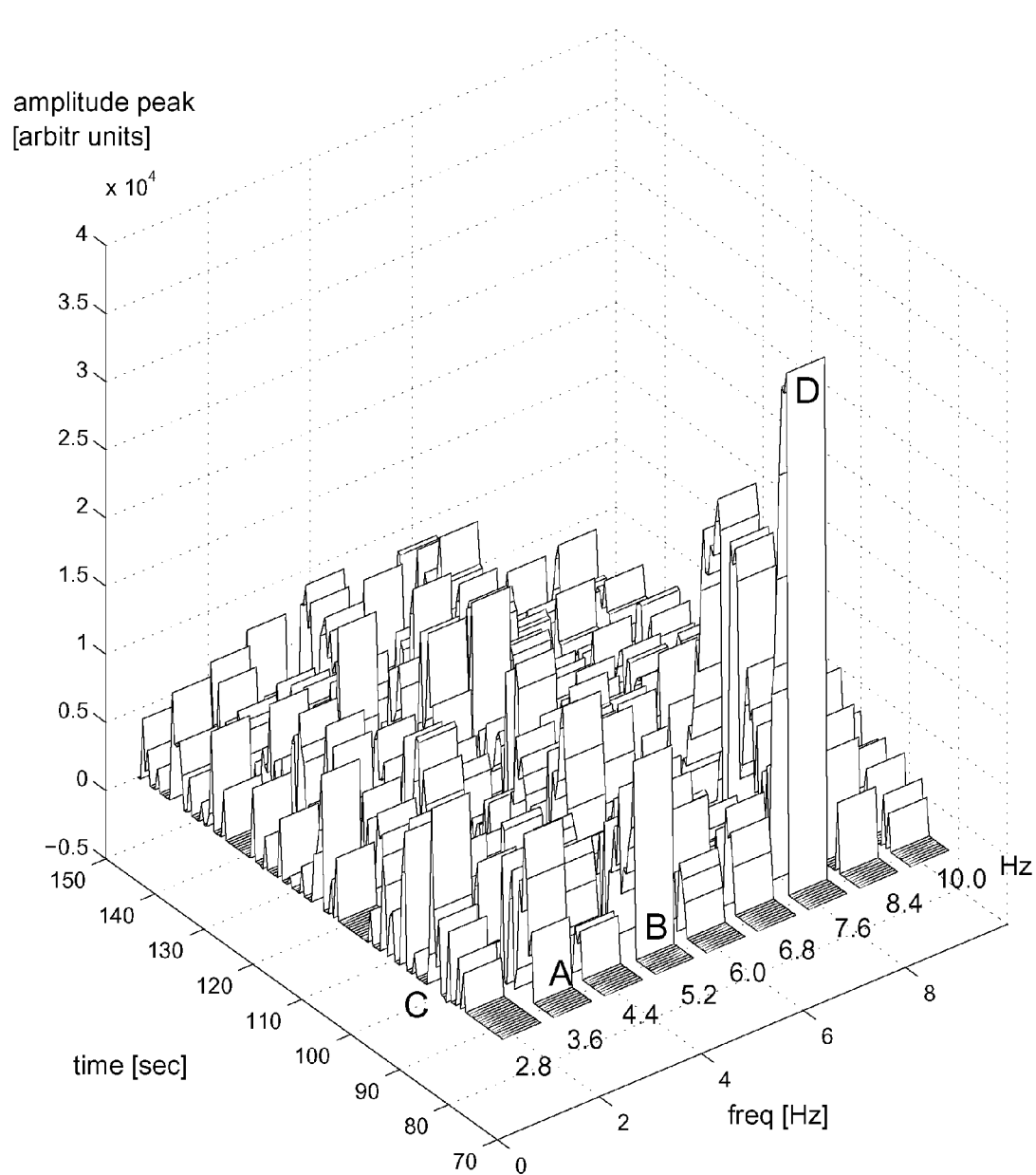

The frequency range 0.1-20 Hz is broken up into groups, e.g. 1.2 Hz wide and the time variation of pulses in this range is observed. An example of this is shown in FIG. 6. Statistics of pulses, such as their time duration (FIG. 8), maximum values (FIG. 7) and frequency of occurrence can be determined. Typically the histogram of regular background noise shows a fast exponential decay of amplitudes and peak lengths. Oscillations which are excited stand out from the noise by differences in the statistics, having persistence in time and a slower decay than regular noise, and or higher amplitudes at specific frequencies than the noise. A frequency time strength plot (FIG. 7) reveals resonating regions, by consistent high strengths at certain frequency bands in time (FIG. 8), compared to sporadic noise. This gives the primary clue if we have oscillations present. Plotting prevailing frequencies versus time and indicating strength and duration e.g. with color is another good way to analyze the data to identify resonators. Such an example is shown in FIG. 9 as a density plot. Statistics can be made, which indicate how long at a particular frequency the duration of excitement is. For real resonators we expect longer time durations, hence they can be identified. If at a given frequency the duration is always short, or smeared all over, it is not a good or likely resonator.

Such data like the prevailing frequencies and duration and amplitude can be plotted again on a map and give a better qualitative indication of resonator presence.

3.4 Sompi Analysis

This is a really essential step in the analysis. The Sump method, while the Fourier analysis assumes nothing on the frequencies ("independent") and calculates individual contributions, assumes linear oscillators of some kind, and calculates individual contributions due to them (Kumazawa et al. A theory of spectral analysis based on characteristic properties of a linear dynamic system, Geophys. J. Int. 101, p 613-630). An eigen-value method delivers prevailing frequency and quality Q values. If no oscillators are present, a diffuse picture results. It is best to do a time analysis first to select the suitable time series to analyze sections where oscillators are suspected. With random noise excitement consistent oscillators may be very difficult to identify.

If random noise in certain frequency range (e.g. the oceanic noise 0.05-0.5 Hz or industrial noise >10 Hz) might well need to be filtered out, to enhance the analysis.

3.5 Depth

Attenuation of weak signal at our frequency range appears to be much smaller than for strong signal (observation from practice), particularly as we deal with relative long wavelengths in the single Hz range. For a wavelength of 1 km (e.g. a velocity of 4 km and frequency of 4 Hz at depth), a depth of 2 km will probably not attenuate very strongly. So depth discrimination due to attenuation (i.e. deeper locations less noticeable) is probably less applicable.

Depth can however be correlated with the character of the signal. Results from Volcanology did show that the signal becomes more uniform with depth. E.g. a signal with many smaller peaks indicates lower depths than a smoother single or few or just one peak(s). Hence the signal shape is used in this investigation. It can be assessed with a quantitative description, e.g. a number from 1 to 5.

A combination of existing geology, 3D geophysical will be needed for better depth estimation. The surface position of resonance phenomena need to be combined with above investigations to determine likely position of the resonators.

3.6 Determine Matches to Resonator Properties

Given the extent of an area and the estimate what fluid type (oil, water, gas) is likely to expect from the regional setting (today usually known, since there are few totally new environments), we can get first order estimates for the frequency and possible quality factor involved (from existing research, primarily in Volcanology, or the theoretical pillow model below). This allows to double check with what was found, looking for general consistency. A detailed discussion of this follows in the section differentiating oil, water and gas below.

3.7 Influence of Gas Bubbles

The formula for Gas bubbles present in a fluid has been derived in Van Wijnggaarden, One-dimensional flow of liquids containing small gas bubbles, Annu. Rev. Fluid Mech. 4, pp 369-396, 1972. It shows a remarkable influence on physical properties even when only small amounts of bubbles are present.

As an example, at atmospheric pressure, oil with 1% bubbles has a speed of only 100 m/s, at a depth of 1 km, the speed is 0.82 km/s at hydrostatic pressure (fluid column); with geostatic pressure (rock column) the speed increases to 1.0 km/s.

Figure 3:
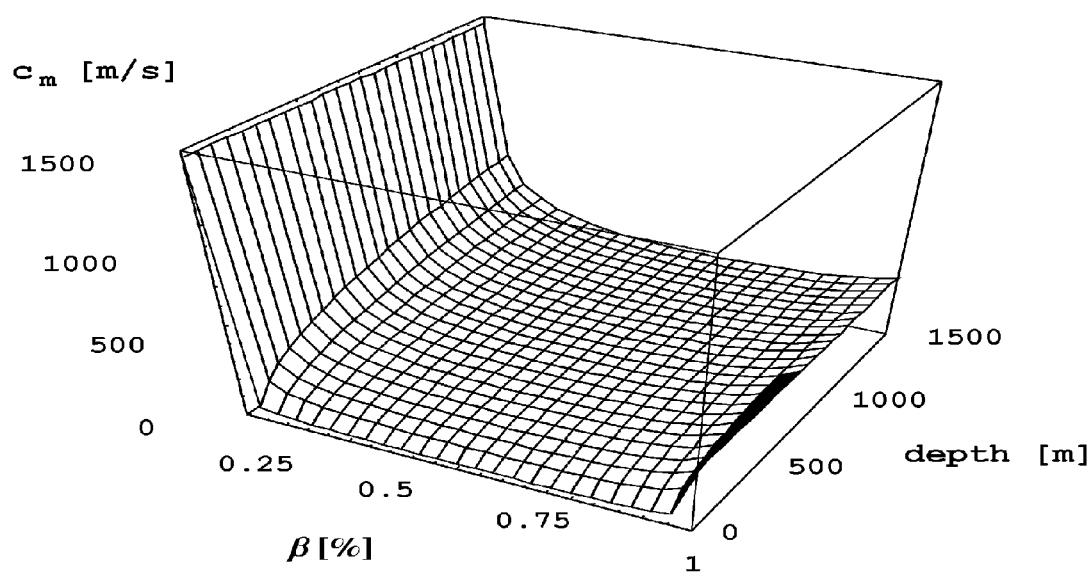

With only 0.1% bubbles in oil, at the surface of the earth the velocity is 310 m/s; it is still below that of water even at 1 km depth, 1.3 km/s. At geostatic pressures it is still only 1.4 km/s FIG. 3 shows the drastic change of fluid velocity for average oil, for the entire range of bubble volume fraction, as well the depth dependence down to 1.5 km. A % overpressure over pure hydrostatic pressure has been used for this figure.

We first evaluate if gas is likely to be present from other information, like regional information, comparison with the geological conditions with know fields etc. Then upper and lower bounds, most likely values are set. With these values and the above cited formula the effect can be estimated and taken in consideration.

3.8 Statistical Comparison

Data are gathered from known oilfields and correlated with the unknown reservoirs, depths and volume encountered. Signal strength, character and reservoir volume and depth are put into a database. These data are then used to cross correlate with new measurements to get the first indication for values of variables involved, like extent, possibly depth.

3.9 Directional Signal Analysis

This is done by use of so called seismic antennas when gathering data. Antennas are small arrays of seismic stations used together, to gather directionality of the signal. Usually from 6-30 stations are used, in an area of a football field or larger. Station distance is 500 m or smaller, dependent on the wave length. An incoming wave from a particular direction can be detected this way. There are seismic processing programs which allow analysis of the data, e.g. SAC (Seismic Analysis Code, Lawrence Livermore Lab, IRIS-Incorporated Research Institutions for Seismology).

As examples serve volcanic and other specific seismic events, which show usually a particular direction or incidence consistent in time. This was found e.g. when analyzing such data on the volcano Stromboli in Italy. Volcanic tremors at Stromboli however gave a more or less locatable source. So did ocean wave noise, it came consistently from a close by shore. Fortunately the frequency of this noise is quite different from the signal of either volcanic tremor or the resonance effects described above. Industrial noise is also detected from close by cities, but varies in intensity diurnally.

If resonance layers are around, we expect them to be distinct from the noise. Since this signal is locatable to a particular source, one should be able to see a consistent location of the source in space and time as opposed to the background noise. If the observed signal is weak, it may need to be filtered out and analyzed separately for directivity.

Given we have 2 or 3 antennas in place (or move the antenna around); we should be able to triangulate the source to some degree. The quality will be limited due to the noise character, and incidence will be likely pretty much vertical.

3.10 Actual Identification of Oil, Gas and Water

The actual identification of the fluid type or presence of fluid at all is only indirect, since there is no direct access to the fluid location. This is the case with any geophysical method. It is a very difficult task in any case, brought out that only 30% of drilled wells actually find oil.

We discuss here the indirect indication in a summary way to highlight this step in the methods. The principles apply to qualitative as well quantitative methods.

An oscillatory phenomenon is characterized by a frequency f and a quality Q, characterizing the decay of the oscillation. These parameters can be determined from measurements. This determination represents essential a transformation of the seismic energy to oscillator respectively resonator parameters.

How is the oscillator physically characterized? Into play come then the dimensions of the area where the fluid is present: length L, width w, and thickness d. Then there are the seismic properties: velocity c or the elastic bulk modulus K, viscosity $\eta$. Depending on the physical concept the crack stiffness $C_K$, and viscous damping F, or the parameters of Biot's theory $\lambda$, $\mu$, r, q to characterize the skeleton for the pillow, furthermore the percentage of gas bubbles present $\beta$.

Oil can be characterized with its API, and gas fraction. Oil, gas and water have distinct, well known, physical constants.

These constants enter into the seismic parameters, i.e. they determine C and F or r, q for Biot, and β.

A physical model is used to relate the dimensions and seismic properties to the oscillator parameters f, Q. It is this physical model that is key link to get from oscillator parameters to the fluid parameters. This is symbolically expressed as follows

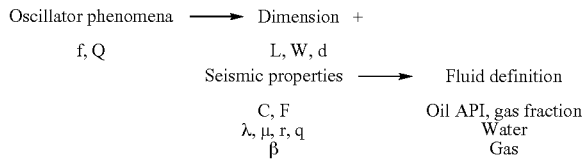

The arrow → represents the physical model.

The strength of this method is that the oscillation phenomen is fluid-only caused, since rock related oscillations are excluded via the H/V ratio, so they give a direct indication to the presence of fluid.

4. Qualitative Analysis

Figure 4:
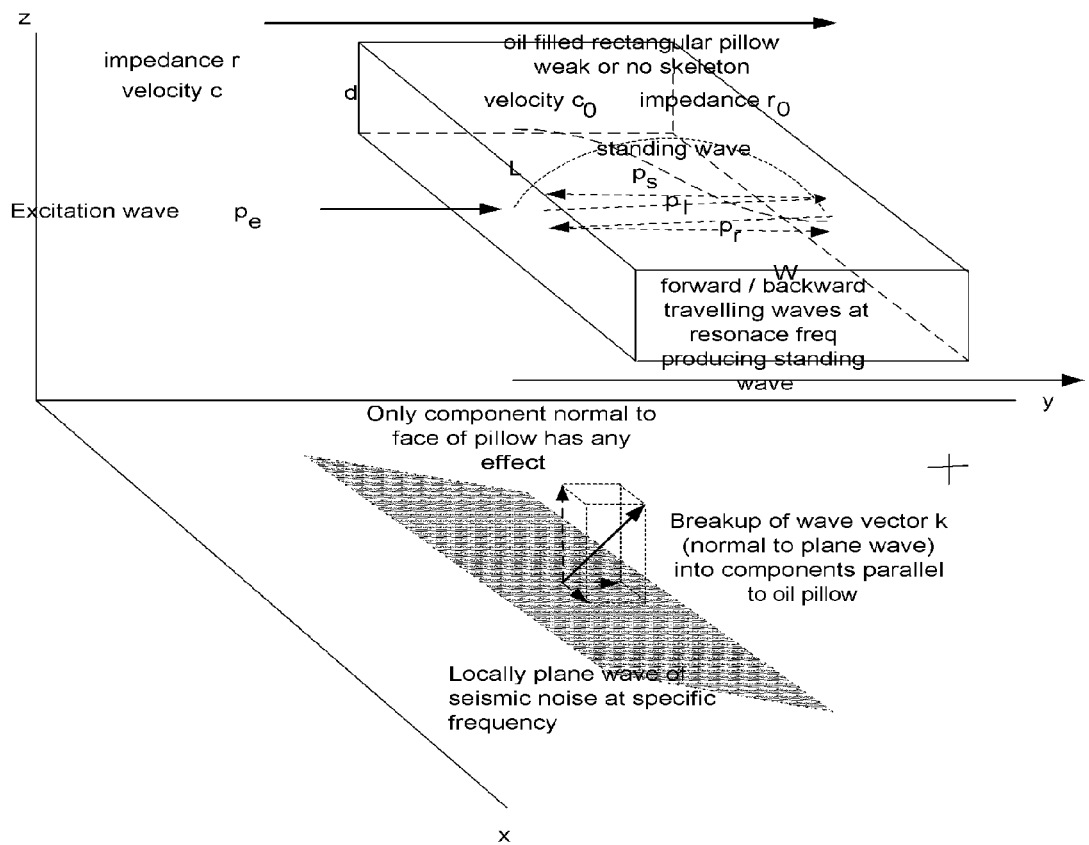

The following section cover the qualitative aspects of the methodology 4.1 Theoretical Model for Fluid Sponge Pillow For a special case of a rectangular, block shaped size of a fluid pillow in solid rock there exists a theoretical solution. The pillow is shown in FIG. 4.

For sound in fluids, assuming inviscous behavior and small particle velocity (much smaller than sound velocity), the Continuity equation can be resolved into the wave equation for a velocity potential $\phi$, defined via velocity vector $\mathbf{v} = \text{grad} \phi$:

$$\partial^2 \phi / \partial t^2 = c^2 \Delta \phi, \text{ where}$$

c is the speed of sound from $c^2 = \partial p / \partial \rho$ (derivative taken relative to equilibrium p), assuming an adiabatic fluid.

A similar equation holds also for the pressure p $$\partial^2 p / \partial t^2 = c^2 \Delta p \text{ from Euler's equation}$$

(See e.g. Landau and Lifshitz, Fluid Mechanics, Addison-Wesley, 1959).

When resonance occurs in the block, a standing wave forms, a superposition of two traveling waves running in opposite direction. For such a standing wave in the enclosed pillow of fluid, with length L, width W and thickness d, as shown in FIG. 4, one can assume a solution of the form $$\phi = \phi_o(x,y,z) \cdot e^{i\omega t}.$$

$\phi_o$ depends only on x, y and z, and is given by $$\Delta \phi_o - c^2/\omega^2 \phi_o = 0,$$

with the following solution:

$$\phi_o = C \cdot ((\cos(N_W \pi x/L) + \cos(N_W \pi y/W) + \cos(N_d \pi z/d)),$$
and $$\omega = c\pi (N_L^2/L^2 + N_W^2/W^2 + N_d^2/d^2)^{1/2}$$

where $N_L$, $N_W$ and $N_d$ are integer values 0, 1, 2, ...

The resonance frequencies are determined by this equation, with the first ones $\omega = \pi c/L$, $\omega = \pi c/W$ and $\omega = \pi c/d$.

Let's assume a certain kind of random signal impinges on the fluid pillow. Locally and temporally one can approximate this noise as a plane wave for a particular frequency. Such a plane wave is shown in FIG. 4 as the shaded plane. The wave vector normal to the plane can be broken down into three components parallel to the directions of the pillow, see FIG. 4. For inviscous behavior, for each of these 3 components only the normal component to the face of the pillow contributes to a standing wave. Components parallel to the face interact via viscosity, they can be neglected here. Hence only the 3 cases of normal impingement are considered. The effect of the impingement in the direction of y is shown in FIG. 4. The sinusoidal excitation wave of pressure $p_e$ and frequency $v_e$ (short solid arrow) has the effect of creating a pressure wave in the fluid in the same direction (dashed arrow $p_l$). At the same time, on the opposite side, the excitation wave having traveled around the pillow at speed c (long solid arrow), starts a pressure wave in the fluid going in the opposite direction (dashed arrow $p_r$). These 2 waves travel at speed $c_0$ and interact to form the free oscillation. At the opposite faces they alternatively reflect and have another pressure pulse added to them from the excitation. For simplicity no outside leakage is assumed in this simple model (very high impedance difference). The resulting waves can be added ad infinitum to create the sum $p[\omega_e, \xi]$ in the top of FIG. 5, where $\omega e = 2\pi v e$ is the excitation frequency, and $\xi$ the phase. Only one side of wave summation is shown in the figure. The summation can be solved explicitly to a very long formula for $p/p_e$ (2 pages), of which the start and tail is shown in the second equation in FIG. 5. Attenuation of the form $e^{-\pi v x/Qc}$ was applied for a realistic summation, with Q the attenuation factor (e.g. Pilant, Elastic Waves in the Earth, Elsevier 1979). The resulting amplitude $p/p_e$ of the free oscillation is plotted as a function of frequency $\omega e$ and phase $\xi$ of the impingement in the bottom of FIG. 5. For the plot the values c=3.5 km/s for rock, $c_0$=1.3 km/s, $v_0$=3 Hz and L=0.43 km were chosen, with Q=10-100.

For the particular case of very long wavelength (typical for oceanic noise), a direct argument can be made. Because the left and right face have just the opposite pressure excitation effect on the fluid, the difference between the original pressure amplitudes in the rock has to be taken for the excitation. At very long wave length this results essentially in a differentiation of the original signal, because to pass the pillow is short relative to the wave length. Afterwards all such contribution are summed up to build up the standing wave (both for the right and left traveling waves), this is essentially the integral operation. Differentiation and integration brings the original amplitude of the excitation back, which is now the amplitude which controls the free oscillation. Hence the free oscillation is modulated in the strength of the excitation by the oceanic noise. This shows up as the higher peak on left side of the graph in FIG. 5. It is below 1.0 due to the damping included in the calculation.

As can be seen from FIG. 5 there are higher frequencies around 10 Hz which can excite the free oscillations quite effectively. The values are clipped in the graph. Actual amplitude ratio reaches above 10 maximum. Evidently in this case the phase is such that instead of a difference as at long periods, summation occurs at the right and left face, leading to larger amplitudes. The exact impingement phase in this case plays an important role as seen FIG. 5. However, it is unlikely that noise is coherent long enough for this to play a significant role in practice. This behavior could be used very well for artificial excitement.

The fact that there is no peak at the resonance frequency itself is due to the speed differences between rock and fluid, which effectively prevents an in sync excitation at the left and right faces, where significant fluid/rock interaction occurs. This instead occurs at higher frequencies as described above.

A specific case that has been calculated also is for noise at the exact frequency of the free oscillation, including the effect of leakage. This case is modeled with excitation only at the left interface (FIG. 4). For an outside pressure wave of $p_{e,}$ an inside pressure wave of $p_i=2r_0/(r+r_0) \cdot p_e$ results, where r is the impedance of the material outside, $r_0$ inside the pillow. At the other side of the pillow this wave gets partially reflected back, in the amount $(r-r_0)/(r+r_0)$, and partially transmitted, by $2r/(r+r_0)$. Since the frequency is exactly the resonance frequency, these waves constructively interfere to sum up. The following sum results for the standing wave:

$$2r_0/(r+r_0) \cdot \Sigma (r-r_0)^n/(r+r_0)^n, n=1 \ldots \infty$$

This sum solves exactly to 1. In other words the pressure of the standing wave $p_s$ is exactly that of the incoming wave pressure outside the oil area $p_e$.

$$p_s = p_e$$

The same result can be obtained using standard boundary conditions ($v_n$, the normal velocity, constant across interface).

Compared to the traveling wave $p_i$ there is an amplification of $(r+r_0)/2r_0$. This factor is 5 for a typical case, with values for oil density 0.8 gr/cm$^3$, velocity 1.3 km/s, and for shale density 2.6 gr/cm$^3$ and velocity of 3.5 km/s (Impedance r=density $\rho$·speed of sound c).

In case of bubbles present in the oil, the effect can be considerably larger, it can reach 45.

This amplification factor is seen only if all the noise toward the measurement station has to pass through the pillow i.e. its main source is located below, and for a large pillow. In general the pillow acts only as an extra source of signal, and the signal level is essentially transferred 1:1 at best from the particular noise frequency to the free oscillation.

In summary, the theoretical model shows that excitation at other frequencies than the resonance can very well excite the free oscillation and thereby transfer energy into the fluid. The major influence probably arises from low frequency oceanic noise. Oceanic noise has the largest amplitudes in the noise spectrum (easily 10×), and therefore is well able to excite the resonance well so it can be observed. It furthermore has the effect of modulating the resonance in a sinusoidal manner in the manner of the original frequency, which agrees with observed oscillations which appear and disappear in regular fashion, roughly in the time frame of ocean noise periods. This latter observation is very consistent. High frequency around 10 Hz also can excite the resonance, but is unlikely to play a significant role. It is well to note that the prime parameter from these calculations is the original amplitude, which at best gets carried over 1 to 1. From this theoretical model one can conclude that no single parameter of the fluid system determines the magnitude of the resonance, it is rather a compendium of geometry, alignment, faces and possibly Q value that influence it, making interpretation more complex.

This model is strictly valid only for no skeleton present in the fluid, or possibly a very weak one. It has been shown by experiments and theory, that if hydrostatic pressure is very high, the fluid velocity more and more dominates the compound velocity (e.g. Gardner et al, Formation Velocity in Geophysics, Vol. 39-6, 1974). Gassman's theory (Vierteljahrschrift Naturforschende Gesellschaft, Zurich, Vol 96, 1951) predicts this also. In the limit where hydrostatic pressure equals the geostatic pressure, the above model for a fluid pillow holds despite presence of the skeleton. For fluid pressure lower than geostatic pressure one can use approximately a model with the compound velocity replacing that of the fluid. Biot's theory (journal of Acoust. Soc., Vol. 28, pp, 168, 1956) expands on Gassman and predicts that 2 waves exist with the skeleton present; the 2 waves are coupled. It is to be expected that part of the solution carries over in form of one of the solutions of Biot's theory. The forward model calculations area needed to show more details in this respect.

4.2 Existing Fracture Model

For the crack model there is an existing model of Chouet available in Dynamics of a Fluid-Driven Crack in Three Dimensions by the Finite Difference Method, J. Geophys. Res., Vol. 91, pp. 1 3967ff, 1986. The model uses a non-dimensional setup. Excitation however is done by crack extension. This needs adaptation to excitation by noise or other non-crack excitation types for use with oil and gas. The physical parameters also need to be matched to oil or gas as fluids rather then volcanic properties. For the rock part the model uses the elastic equations i.e. Hooks law for small strains $$\{\sigma_{ij}\}=2\mu\{e_{ij}\}+\lambda\{\delta_{ij}\}\Sigma e_{kk}, \text{ and the conservation of momentum}$$

$$\rho \partial^2\{u_i\}/\partial t^2 = \text{grad} \cdot \{\sigma_{ij}\}, \text{ where}$$

$\{\sigma_{ij}\}$ and $\{e_{ij}\}$ represent tensors of stress and strain (components i,j), and $\{u_i\}$ the displacement vector, grad is the gradient operator dot product which operates on one column of the tensor. $\mu$ and $\lambda$ are Lames coefficients of the rock, $\rho$ its rock density.

For the fluid only two dimensional equations are used, since prior research showed that the motion normal to the crack is negligible and the parallel motion in the crack has a parabolic distribution that can be a priori integrated out. Viscosity is included.

Hence two dimensional version of the conservation of momentum and the equation of continuity are used for the fluid, the same equations as for the theoretical model for the pillow in section 4.1. There is however a viscous term included of size $12 \cdot \eta/\rho_f \cdot d^2$ derived from averaging over the thickness of the crack, where $\eta$ the viscosity, $\rho_f$ the density and d crack thickness. If viscosity is ignored, the wave equation for pressure results as used in 4.1 for the fluid pillow.

For the boundary condition the normal motion relative to the crack surface between fluid and solid have to agree, where as the fluid can slide along the crack surface.

There are 2 characteristic parameters for this model, the crack stiffness $$C_k = b/\mu \cdot L/d$$

and viscous damping loss $$F = 12 \cdot \eta \cdot L/\rho_f d^2 \cdot \alpha,$$

where L the crack length, d thickness d, b bulk modulus of fluid, $\mu$ the shear modulus, $\rho_f$ the fluid density and a the fluid velocity. The former will be used below when discussing differentiation between oil, water and gas (section 5.3).

The key results for the application to resonance in oil or gas reservoirs, under others, are diagrams showing the spectra of particle velocity at the crack surface, showing the resulting resonance frequencies.

The dimensionless frequency is defined as $f=v\cdot\alpha/L$, where v the actual frequency. As an example, the lowest f in the simulation is ca. 0.17, the strongest ca. 0.65 for a crack with stiffness 5, aspect ratio 50 (L/d), an inviscous case (F=0).

This model is to be reused, or duplicated as Finite Element code, but with a different excitement function and adapted to oil or gas parameters. The dimensionless aspect of the current model facilitates this.

4.3 Forward Modelling Outline

Forward modeling is used to establish a closer fit to the measured data, after the qualitative investigation determined the general character of the source. The established data of the qualitative phase, as well as additional information from 3D seismics and geology are used to set starting parameters of the model.

For the crack model we assume a crack distribution over the area of the suspected reservoir, either uniform or randomly distributed. It is unlikely that the reservoir consists only of one single crack. The distribution parameters, crack size and direction are model parameters. The existing single crack model from Volcanology (section 4.2) can be used, with substitution of the fluid parameters for oil or gas. As excitation random noise is used, which either is synthetic or better approximated by use of actual noise spectrum from nearby. Such a sample should come from outside the suspected oil area, ideally on basement rock, at equivalent distance from ocean. Possibly industrial noise can be added in where applicable (derricks, traffic noise, industry or city noise). The seismic noise in case of fractures is applied at a convenient model boundary, outside but close to the crack. The application point(s) are part of the model parameters. Fractures are treated as independent units for a first order approximation. The contributions of the cracks to the total are then treated separately as point sources. By using a Greens-function approach we can add the contributions together for each crack by migration of the signals to the measuring station at the surface. The overall velocity properties established in the quantitative analysis come to bear here; alternatively borehole logs or 2D/3D seismics can be used for the velocity profile. It is assumed at those distances to the surface the cracks can be treated as point sources.

A more sophisticated simulation will model the cracks together in a single model, which allows for dependence between the cracks. This model needs to be constructed first. The migration to the signal to the surface can be done as before, as long as the distance to the surface is large. The block which models several fractures together can be reused as a setup for many simulations; just the parameters of the dimensions need to be readjusted. To demonstrate the necessity of this more complex model, the effect of interaction between the cracks should be estimated first. The procedure for this can follow the methodology which is used for interaction of bubbles in water, for which such solutions exist.

These crack models assume the cracks are smaller than the distance to the earth's surface; otherwise a crack model is needed that includes the free surface of the earth. This substantially complicates the model, because of the oblique orientation of the free surface in the grid and the many possible orientations of crack surfaces relative to the surface of the earth. In most cases however the depth to the reservoir is substantial relative to crack size. It is unlikely that cracks extend completely along the length; more likely are en echelon type arrangements, where crack length is limited. Possibly a line source can be used instead of the point source, if there is large length of the reservoir and crack orientation is along it, and there is evidence the crack extends along all its length.

Figure 10:
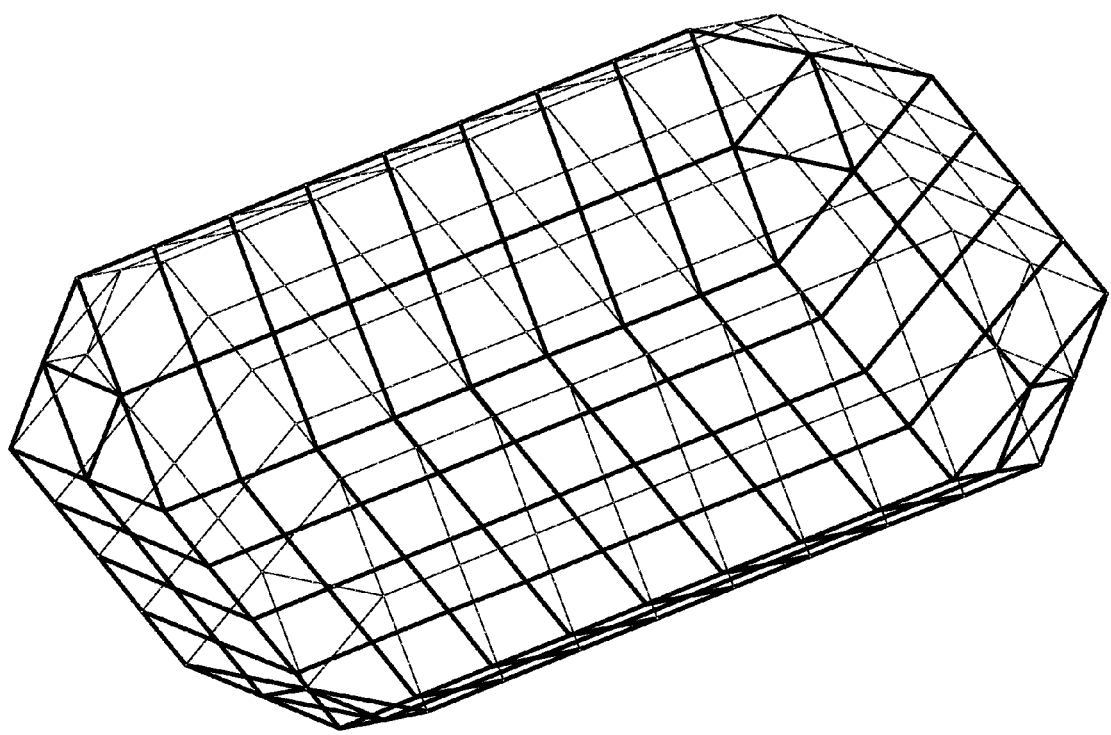

In case of a saturated fluid pillow a straight forward model is possible. A finite difference or finite element grid will be used, using the equations of elasticity and the fluid equations (Conservation of momentum and equations of continuity). The sponge is modeled as a combination of fluid and elastic skeleton in the shape of a lens, both contributing to holding part of the pressure. The sponge is contained in solid rock. FIG. 10 shows an example of the pillow in the case of a finite element grid. Biot's theory will be use for modeling. The model may include the free surface, if the depth of the sponge zone is shallow relative to its dimension. Unlike for en echelon crack, the inclusion of the free surface may be appropriate for this type of model. This model is set up once, and the model parameters can be adjusted for specific applications.

For excitation we assume point sources distributed at the periphery of the detailed physical model. The noise setup is as described above. The response at the surface is directly calculated, if the free surface is included. For large depths it will be migrated to surface by representing the model by one or more point sources.

For both types of models the signals are then compared with the observed values, especially in the frequency range of interest. Several parameters of the models (thickness, depth of lens, direction and density of crack distribution, fluid properties) are then be adjusted, and by repeating the model calculation the best fit of the data is obtained.

Either of the two models can substantially improve and confirm the information about the fluid filled portions of the rock obtained in the qualitative analysis.

4.4 Best Physical Concept Selection for Numerical Model

Several physical models to be used for the numerical simulation have been, and will be discussed in the detailed description below:

a. the crack model, with one or several large parallel cracks in the 100's of m, for details see section 6.2 step 3a, b. the crack model in form of an assemblage of smaller cracks in the 1's to 10's of m (small relative to numerical modeling dimension, crack length L<numerical model dimension $\Delta L$), for details see section 6.2, step 3b, c. the fluid saturated sponge pillow, potentially over pressurized, the detailed model consisting of a single pillow, but several pillows can exist in conjunction, for details see section 6.2 step 3c, d. an alternate or modified physical model better situated for the situation at hand.

In practice only one of these physical concepts will be selected for the model, for economic reasons, and because only one model suits the investigated area best.

Here we discuss some of the selection criterions.

For relatively young and unconsolidated sediments, where fracturing is uncommon, from e.g. surface indications, the pillow model is best selected. For formations where deformation is or has been small or consists of plastic yielding, the pillow model is suitable also.

Formations where fractures are evident, e.g. block structures, fractures evident in seismic surveys are good candidates for the large fracture models. Older consolidated sandstones and lime stones, especially where e.g. AVO analysis indicates consistent fracturing, are good candidates for the concept of an assemblage of cracks. If the formation is exposed close by and shows consistent small fractures, or wells show this indication, the same model applies. An intermediate range between small and large cracks is also better represented by an assemblage of crack models. If the rock has very high porosity (30%) on the other hand the pillow model might be more suitable.

The selection of the physical concept a-c depends strongly on the particular situation, and information from seismic surveys, bore holes or exposure of the same formation close by is important in this respect. If the situation shows that none of the above models apply well, a modification of the above concepts can be used, or a completely alternate model might apply (type d).

5. Differentiation Between Gas, Oil and Water

The use of the characteristic resonance frequencies for oil, gas or water saturated media enclosed as fractures or pillow(s) in rock has been described in the sections above. This section expands on this to give a method to differentiate between fluids.

Oil, gas and water have different physical properties, of which we use the density, wave speed (speed of sound) or the bulk modulus, and viscosity. As a first approximation we assume the fluid to be inviscous, and in-compressible. Further refinement will take the latter two parameters also into consideration.

We have 2 models of such system, one based on cracks and one based on a fluid pillow in rock. Each of these traps internal waves and lead to characteristic oscillations.

For these 2 physical models we can numerically model the interaction of the fluid filled enclosure with the surrounding rock, when it is being excited by external forces.

The oscillation can be described by 2 parameters: The characteristic frequency $v$ and its over-tones, and the corresponding quality factor Q, which determines how fast the oscillation dies out.

Because of the different fluid properties these 2 parameters $v$ and Q will depend on density and speed of sound of the fluid.

The method of this patent consists of using these numerical calculations to identify oil, gas and water using the frequency (and its overtones), and to a lesser degree the Q dependence on the fluid properties.

The crack model has been analyzed in detail in Volcanology, and the relevant equations are already published (e.g. Chouet 1986, Kumagai et al., 1990).

The relevant variables for both models can be stated as follows:

The crack(s) or fluid pillows can be described by a length L, width W and thickness or aperture d. The surrounding rock is given by p-velocity of a and density $\rho_s$.

The enclosed fluid matrix or sponge is given by the speed of sound A and density $\rho_f$ In the case of the sponge we have the density and elastic properties of the skeleton of the sponge.

It is customary to use dimensionless variables in numerical modeling, which are $\alpha/A$ for velocity, $\rho_f/\rho_s$ for density, $vL/\alpha$ for dimensionless frequency As an example, for Volcanology research it was found that the dominant frequency was at roughly a real frequency of 3.5 Hz, with overtones at 6 and 10 Hz for a vertical crack of 150×75 m. The dominant frequency here was a transverse oscillation where the wave length was 2/5 of the width W. It is clear that specific simulations will have to be done for the situation encountered in oil fields, but the overall behavior will be the same.

Kumagai and Chouet, 2000 (journal of Geophysical Research, Vol. 105, Page 25493), estimated Q factor and dimensionless frequency $v$ for a wide range of values of the dimensionless parameters for velocity and density above. Given the specific values for oil gas mixture and host rock of the reservoir, the actual frequency and Q estimates can be determined from these simulations.

For example, typical thin oil (API 38) with little gas has a velocity of 1 km/sec and a density of 0.8 g/cm³. Water has a velocity of sound of 1.5 km/s and a density of 1 g/cm3. The typical host rock has a velocity of 3.5 km/s (2.5-4.5 km/s range) and a density of around 2.6 g/cm³.

The dimensionless frequency for water is 0.17, for oil 0.19, for gas 0.12-0.26 from Kumagai and Chouet, 2000.

Here we have a difference of 12% between the values. Given fracture length and host rock are the same for both cases, this will be also the difference between actual frequencies. This can be used with sufficient precise measurements to distinguish between oil and water.

If gas is dissolved in oil, like it is mostly the case, this difference will increase. For very heavy or viscous oil the effect will be also very noticeable, but is yet to be determined.

The actual frequency is then determined from the dimensionless frequency estimated from the simulation by $$\text{frequency } f = v \cdot \alpha / L$$

While the speed of rock can be estimated fairly precisely, we depend on the dimension of the length of the crack to determine actual frequency. The quality of the model dimensions are very important therefore, and need a lot of input from other investigations. E.g. if the thickness of the oil bearing layer is known, and observations of cracks in this formation are possible by exposure at the surface in close by areas, then crack length can be reasonably estimated. Also geophysical techniques to investigate crack systems can be used to determine the extent of the fractures present in the area.

In any case, a detailed physical model is needed to validate and confirm the results of the above rough estimates.

In nature a system of parallel cracks is very likely to occur. In this case we can first order approximate this system as an overlap of single cracks, as long the oscillation doesn't substantially contribute to the excitation of the neighbor crack and the stress field of the single crack drops off substantially before reaching the neighbor crack. Otherwise a model of parallel interacting crack needs to be used. In this respect it is interesting that a series of parallel cracks have a tendency to excite each other in feeding energy in the critical range of the oscillation to the neighbor crack, amplifying the behavior.

For the case of a fluid pillow a numerical solution has not be done and is part of this effort to establish similar parameters as for crack systems. In the limit of a very thin pillow (often the case for thin layered reservoirs), a fluid pillow can be approximated with a fracture of large aspect ratio. We therefore expect similar behaviors for fluid pillows.

6. Detailed Method Description

Following is a step by step description for the qualitative method and the quantitative method for the overall examination.

There is an application of the theoretical model to oscillator data.

There follows a qualitative method and quantitative method for differentiating between oil, gas and water.

These methods consist of several steps, which often use standard techniques in Geophysics or Science. At other places we use an existing technique with a new application, or entirely new developed technique. For clarity the steps are marked with a designation of the type of technology:

ST standard technology in the industry

NA new application of existing technology

ET extension of existing technology

ND new development

Hence this patent consists of a compendium of these technologies which are used to solve the problem to locate oil, gas and water in the earth and differentiate between them.

6.1 Method of Qualitative Analysis

The step numbers correspond to the sections dealing with the qualitative method.

| Step | Sub | Description |
|---|---|---|
| 1 | | Seismic measurements with long period seismographs of high quality (accurate in the frequency range of 0.1-20 Hz) |
| | a | Normal measurements (ET) <br> Set out seismographs of the type above in an area to survey x by y km, in a regular square grid of size s. A profile line of length x km can be used for preliminary or limited tests. <br> The resolution of the grid size s can be adjusted as needed, as a guide serves the wave length (e.g. for a velocity of 3 km/s and a frequency of interest of 3 Hz, gives 1 km). A finer resolution can be used for closer examination. Typical values range from 0.2-1 km. <br> Reference measurements surrounding the potential oil or gas area need to be done. This also serves to collect noise values for simulations. A long term measurement needs to be done at least at one station. Measurements are done away from local noise and in buried holes to avoid wind effect. A hole of ca ½ m results in adequate signals. <br> The results of the measurements are seismograms of the ground velocity on solid ground, or displacement in water. Accelerometers result in acceleration values. Depending on need conversion to absolute values are not needed, but can always be done. |
| | b | Array measurements (ST) <br> Usually not enough instruments are available to cover entire area, hence sections are done at a time, such that each section forms an array, e.g. 3 by 3 seismometers, each a distance s apart in a rectangular fashion. Move this array around on the grid of the survey area. If possible normal (type a) measurements are done as array (type b) measurements. <br> The grid size of array measurements has to be small enough so that plane waves can be resolved unambiguously, so the distance needs to be smaller than the smallest wave length to be resolved (e.g. for a velocity of velocity of 2 km/s and a frequency of 5 Hz, the wave length is 400 m ) |
| 2 | | Excitation (NA) <br> Excitation happens by normal present noise sources in the earth, as outline below in 2a-2h. The noise should be far enough away so as not to obliterate the resonance signal, and ideally have components in the resonance frequency range. |
| | a | Excitation by ocean noise, 1 Hz down to 0.01 Hz <br> Useful excitation |
| | b | Excitation by general industrial noise <br> Useful excitation |
| | c | Excitation by oil pumping noise (derricks etc) <br> Useful if far enough away |
| | d | Excitation: normal tectonic noise <br> Useful excitation |
| | e | Excitation by traffic noise <br> This is generally undesirable if close by, and is eliminated out of record if close enough. |
| | f | Excitation by wind noise <br> This is generally undesirable, and avoided by digging instruments in to the ground. |
| | g | Excitation by Solar and lunar tides <br> Can reinforce other noise sources on more long term periods (6 h or 3 day cycle) <br> Movement range is around 1 m, possibly disturbing equilibrium conditions (stress) |
| | h | other sources |
| 3 | | Corrections (ET) <br> Amplitudes may need to have corrections applied for different geology and surface conditions. <br> The soil layer will amplify the signal inverse to the square root of impedance ratio, where the impedance is density * velocity. <br> Topographic corrections are needed, varying from 0.3 to 4 (seismic literature examples of corner effects). <br> Noise correction is needed where close to a noise source, which drops off (inverse of power of distance to point source). <br> Time variations are possible for diurnal noise, or tides. A reference station is used for this purpose, operating continuously during campaign. |
| 4 | | Main analysis <br> The purpose is to establish overall properties |
| | a | Overall analysis (ET) <br> The Fourier transform of the seismogram is used for the entire period of the measurement to determine averages and variance, i.e. the statistical distribution, giving individual contributions to a frequency, independent of any physical model. Conspicuous frequencies occurring during the excitation phase, their amplitude (and less important phase) can be plotted in form of contour maps, giving the strong signal areas in the region and allowing to determining potential source regions S and their extent (length L, width W). This step gives |

| Step | Sub | Description |
|---|---|---|
| | | an indication of the first order behavior of the oscillatory system.<br>The general velocity structure of the area is obtained by assuming stochastic nature of the signals in the seismogram, and using the separately measured points as an array for the entire area simultaneously. Station distances of <300 m are needed fro this analysis, ideally in a circular array. The spatial correlation coefficient is determined as function of distance and azimuth, from which the dispersion characteristics for velocity of the waves can be obtained. Then the fundamental modes of Raleigh and Love waves for an assumed velocity structure is matched to so determined velocity dispersion, which results in the velocity as function of depth dependence (Chouet, 1998 Bulletin of Seismological Society, Vol. 88, pages 653 ff). This step does not require an excitation signal.<br>Results of this section are the stepping stones to more detailed interpretation in the following steps. |
| | b | H/V exclusion (ST)<br>H/V is the ratio between horizontal and vertical components in the spectrum. Do a standard H/V analysis of the signal stream to exclude observed signal peaks in the Fourier spectrum during excitation, which are associated with pure rock structures and layers following, e.g. Nakamura's method. They are caused either by an effect of the fundamental mode Raleigh wave or by SV waves (Nakamura) excited by such structures. |
| | c | Time analysis of signal (ND)<br>Take the Fourier Transform of the signals measured over short, shifted time windows, moved along the time axis. The window size needs to make sense for the roughly 5 Hz signal expected (containing a handful of oscillations), so windows of 3-15 sec size are useful. Too short time windows don't allow sufficiently accurate frequency determination, to long time windows smear out actual time variations. The shift is a fraction of the window size, adjusted such that noticeable variation is detected per shift. Typical range is 0.1-0.5 of the window size. The entire frequency range can be split up into frequency slots (e.g. ½ Hz) and thereby the peak distribution in time determined. Peaks which consistently show up at certain frequencies in the 1-10 Hz range indicate oscillators, see FIG. 6. There may be 1 or more (main resonance and overtones) due to one resonator. Select descriptions of these peaks that are such that they describe the observed signal such that the oscillations can be differentiated from the general noise obtained from a reference point. E.g. amplitude peak size (FIG. 7), shape (breadth in Hz), duration in time (FIG. 8), consecutive occurrence (FIG. 9) can be used to describe these peaks as a function of time. Statistic distributions in form of a histogram then assist in isolating oscillations hidden in the general noise, e.g. a histogram of the peak maximum in FIG. 7 and of the peak length in FIG. 8. Differences from the general noise statistics become visible and allow thereby identifying oscillators. Alternatively phase information can be processed in conjunction (The Fourier transform delivers both). These characteristics of the peaks are mapped over the region. |
| | d | Sompi Method (NA)<br>The Sompi method stands out above the Fourier transform, as it selectively keys in on oscillators present in a time series, which get excited and die out. Like the Fourier transform it maps the signal into a set of independent contributions (frequencies). It keys however into finding the frequencies caused by oscillators, unlike the Fourier transform, which makes no assumption behind the physical mechanism of the component-frequency. It is important to use relatively clean sections of time series which have oscillators present, possibly pre-filtering/preprocessing the record using the information obtained from the time analysis step. If noise alone is dominating, only a diffuse picture results. The dominating frequency and quality Q values can be extracted. This applies particularly for excitation turned on/off periodically (step 2d). This is the major processing step to locate oscillators in the record. |
| | e | Depth (ND)<br>The character of the signal is used to get a low or large depth estimate. Following experience from Volcanology, simple shape character of the signal means a larger depth. There may be other indications, like amplitude variations, or generally low signals in an area. The information of the time dependence of the signal is used here also (statistics) |
| | f | Trend mapping (ST)<br>All results of step a to e for individual measurement points are mapped regionally to determine trends. These covers the frequency f, possibly phase information, the Q factor (step d), depth indicator, and time variations of f. |
| | g | Statistics (ST)<br>Comparative statistics where applicable can be applied to values found in the analysis. A comparison is done with existing information gathered during previous campaigns, or known cases, where oil and gas information was available. The data is also prepared so it can be used in the future for comparisons. |
| 5 | a | Matches to resonator properties (ND)<br>With the geographical extent of the signal (length and width), known properties of the general area (e.g. formation thickness, crack orientation), and by estimating likely ranges of properties of fluids involved, one can use tables and graphs from existing simulations done in Volcanology, adjusted to oil and gas |

| Step | Sub | Description |
|------|-----|-------------|
| | | properties common in oil exploration, to obtain frequency $f_r$ and quality factor $Q_r$ of oscillators (detailed discussion in method 6.3). Alternatively one can use the formula from the theoretical model (section 4.1) to obtain $f_r$. Frequency $f_r$ and $Q_r$ values can also determined from numerical model using real physical material properties. The results are then compared with actual observed values of f and Q in step 5c.<br>Another qualitative indirect assessment of observed Q from measurements is possible if oceanic noise <1 Hz is strong, taking advantage of the amplification effect. In such cases Q can be obtained via the formula (FIG. 5, middle). A better direct way to get observed Q is the Sompi method (see step 4d). |
| 5 | b | Influence of gas bubbles (ND)<br>Gas bubbles substantially influence the resonator properties. The likelihood of gas and bubbles needs to be assessed from other information (likelihood of gas present, pressure situation), the observed dimensions of signal area (presence of bubbles effectively reduces the wave length), and indications discovered during processing (e.g. determining overall velocity structure, step 4a) and taken into account when determining properties of the resonator. |
| 5 | c | Resolve if have an applicable physical mechanism, indicating fluids exist (ND). Check if we have a fit with a physical model, i.e. the crack model, the theoretical pillow model or a numerical simulation, by matching in step 4c and 4d actually obtained resonator f, Q data and possible resonator properties in step 4 f (quality $Q_r$, frequency $f_r$ from length, width, thickness, velocity contrast). Here the entire range obtained needs to be considered in the light of all observed mappings and all observed details. Values may need iteratively to be readjusted to obtain a valid first order fit to a plausible physical model, or reject it if not present. It is also important to take into consideration the effect of potential gas bubbles content in the fluid on found results, as just 1% of bubbles can strongly affect the physical properties of the fluid, and with that the resonator properties. |
| 6 | | Array analysis (NA)<br>There are standard methods around to analyze array measurements. A good description is given by Peter Goldstein, 1987, Geophysical Research Letter, Vol. 4, pages 13 ff. There is code available for this analysis in form of the seismic analysis code (SAC) program from Lawrence Livermore Labs or IRIS (Incorporated Research Institutions for Seismology). We analyze the array measurements for each array, using only the signal part around the resonance peak(s) determined from step 4 (b, c, d).<br>We use a suitable high and low pass filter to extract this part and run it through the calculation. The result is the main contributors to this filtered signal and their direction. These vectors can be tracked on the map for the arrays, indicating the direction to and strength of resonators, and thereby fluid containing areas. If we have distinct oscillation sources, triangulation may be possible by using several arrays together.<br>This investigation also will reveal the direction to possible noise sources in the region, which contributed to the signal, as part of the investigation. |

6.2 Method of Quantitative Analysis

In this section the quantitative steps of are described.

Initial Application of the Theoretical Model to Estimate Oscillator Properties

This section details the method applying the theoretical fluid pillow model serving to characterize an oscillator further estimating physical properties. The first step in the quantitative analysis is to compare and match to the theoretical fluid pillow described in section 4.1. This is applicable where there the general geometry and orientation allow applying this model. The adapted acoustic velocity of the oil bearing skeleton under appropriate hydraulic pressure (Gassman's theory) is to be estimated, possibly from alternate sources (general geology, regional geology, existing well). In this respect the effect of bubbles of gas in the oil, which is very common, needs to be taken into account. With these results and the formula for the resonance frequency given in section 4.1

$$v = c/2\sqrt{N_L^2/L^2 + N_W^2/W^2 + N_d^2/d^2},$$

estimates of length L, width W, possibly thickness d can possibly be made (at least for L). The $N_x$ values are of course low values, 0 or 1 in most cases. These represent the modes of the oscillation.

If oceanic noise (frequencies <1 Hz) is a strong part of the noise in the area, and, as is common, the resonance varies in a regular modulated way, a correlation should be done between the two, to see if the resonance contains periods of the oceanic noise. In such situations, the ratio of oceanic noise to signal strength can be examined further. A correlation between oceanic noise periods and oscillation modulation periods needs to be done. If there is a fit, excitation to oscillation ratio can be compared with that obtained for different Q values. Noise components in the frequency range where the theory show strong amplification at higher frequencies around 10 Hz (FIG. 5, bottom) should also be checked, to see if they contribute to the resonance as well. Key is in general that the resonance typically can at best reach the level of excitation; therefore very careful determination of local site effects should be done to avoid misleading bias.

Numerical Models

For these models, the step numbers correspond to the steps in other sections dealing with the quantitative method, where specifically steps 3a-3c specify the corresponding physical models.

| Step | Sub | Description |
|---|---|---|
| $s_{tart}$ | | Model analysis (NA)<br>A better quantitative analysis is possible using a standard forward model. For this purpose a twofold approach is generally used in Geophysics. We refer for a good example to Chouet, Journal of Geophysical Research, Vol. 91, Pages 13967 ff. A detailed model is constructed to derive the properties of the source nearby it, using the given physical concept. This physical concept represents the best match to the actual situation under investigation; it is described in step 3 in from of three types (crack, crack assemblage, fluid pillow). Only one particular type is selected, both for situational and economic reasons. There may be situations that require modifications of the physical concept; it is not thought to be exclusive, but represent the most likely situations. For large distances the detailed model, thought of as a signal source, is concentrated at a point and so propagated to the actual measurement sites. The detailed model (signal source) can be applied multiple times, e.g. in the case of a large crack, it can be reused to generate a superposition of several large cracks, or only once in case of a fluid pillow.<br>We then compare the parameters determined for the signal peaks in the analysis of step 4a-4d of the method 6.1 with the resulting characteristics of the synthetic seismograms. The model parameters can be adjusted to improve the fit. A reasonable good fit confirms the model parameters. |
| 1 | | Initial model parameter estimation (ET)<br>From geological information (exposures etc), other geophysical investigations (2D and 3D seismic) and possible existing wells, we can get estimates for a) single or multiple depth sources, b) the possible depths, c) thickness of formations, d) porosity, e) permeability, f) crack system orientation, g) crack system extent. h) A seismic velocity profile can be determined in most cases with this information. If not, there is a standard analysis described in step 4a of method 6.1, which also allows obtaining a velocity profile. h) The preliminary analysis in method 6.1 steps 4a-4e gave source regions S and their dimensions which now can be used as source areas. Using this information, we now can set up a model.<br>In case of a fracture model, we assume reasonable fitting crack dimensions. Length L will be maximum 300 m-800 m or smaller, width W determined by the thickness of the formation of interest (Maximum value) or other indication from similar environments or circumstances. In most cases the host rock will be exposed somewhere close by to give its density. There maybe an oil or gas type known for the area. From this we can determine two critical parameters for the crack model: the crack stiffness $C = b/\mu \cdot L/d$, where b the bulk modulus of the fluid, $\mu$ the shear modulus of the rock, d the crack thickness. The latter is usually very small; aspect ratios of 1:100000 are typical; maybe 1:10000 if overpressure exists in the fluid exists. Another parameter is viscous damping $F = 12\eta L/\rho 6\ d^2\alpha$, where $\rho$ the density of the fluid, $\eta$ the viscosity, $\alpha$ the compressional wave velocity of the host rock.<br>The third parameter is the dimensionless resonance frequency $f = v\alpha/L$, where v the real resonance frequency.<br>Furthermore we have to assume a density of cracks in the area, e.g. by use of geologic evidence or AOV seismic results.<br>An important step is further to consider the influence of gas present (see step 2) In case of the pillow with skeleton model, porosity and permeability estimates can be obtained from general or neighbor geology, orientation of the pillow for 2D or 3D seismics or surface structures.<br>The information for the skeleton and fluid are used to define the parameters for Biot's theory. |
| 2 | | Influence of gas bubbles on properties of resonator (ND)<br>The influence of bubbles in oil or water, even in small quantities effectively lowers some physical properties, like velocity and impedance. While the density is practically unchanged, the acoustic velocity in the oil is much lower.<br>The formula is $c_m^2 = P_0(1-2\beta)/\rho\beta \cdot (1-\beta)$ for small $\beta$, where $\beta$ is the volume of gas occupied in the volume of mixture, $\rho$ is the density of the fluid, $P_0$ the mean pressure in the mixture.<br>As an example, at atmospheric pressure, oil with 1% bubbles has a speed of only 100 m/s, a reduction of 93%.<br>The substantial decrease of the Impedance by a small amount of bubbles present reinforces the effect as a resonator. This needs to numerically taken into consideration using the above formula. We estimate the likelihood of gas from alternate information (regional, comparative geology, wells), use sensible upper, lower and most likely values for volume % ($\beta$), and via the pressure p at depth estimate the effective speed $C_m$. The pressure at depth needs to take into account the difference between hydrostatic and geostatic pressure, most likely the actual pressure is somewhat higher than the hydrostatic value. |
| 3 | | Numerical model steps outline (NA)<br>The model is made of 2 sections:<br>    a. a detailed numerical model of higher precision in the area of the source region S using the given physical concept detailed below. The source region S (possibly several) is identified in the method 6.1 steps 4a-4e as the high signal areas. Step 1 gives further constraints like the layer they could be located in at depth. This region is divided into a 3D grid (finite element or finite difference grid). We apply the physical equations to this area (elasticity for |

| Step | Sub | Description |
|---|---|---|
| | | solid rock, fluid equations for in-viscid and incompressible fluid) and set appropriate boundary conditions. This procedure is standard in geophysical modeling, for a close example see step 3a. The excitation function as determined in step 4 is then applied as input. Output is then calculated at one or several desired locations serving as reference points for further calculations. This serves to idealize the detailed model to one or more point sources.<br>b. (ii) In the next section this output propagated to the surface. The source region, if far enough away from the measurements, can be reasonably well approximated by one or more point sources at that distance. The sources are propagated via a Greens function approach to the measurement locations. This is a standard procedure in Geophysics, for the details see step 5.<br>In the special case of very shallow source region, the detailed model (i) can be simply expanded to include the measurement locations and the complete calculations can be done in model type (i) without need for propagation section (ii). In the following three physical concepts are described to be used for the detailed numerical model. |
| | 3a | Numerical model with cracks (NA)<br>For this physical concept of a single crack, possibly superimposed to form several cracks, the detailed model for a single crack follows closely Chouet, 1986, Journal of Geophysical Research Vol. 91, pages 13967 ff. The crack orientation $\phi$ is estimated as in step 1. We use the other model parameters to constrain the model further (length L, width W, thickness d, and the expected physical properties of fluid and rock). The crack response is then calculated for a single crack. The main difference to Chouet, 1986 is the excitation function. The excitation function of step 4 below is applied to the model at specific points, e.g. the middle or end of the crack. The point is chosen to represent the most likely situation where the suspected noise comes from (e.g. from the array analysis of step 6 of 6.1).<br>As explained in step 4 the seismic noise, as measured, representing the excitation, is migrated to this point at depth e.g. using a Greens function approach or transposition, and appropriately adjusted for impedance differences to surface conditions as needed.<br>From the crack response an equivalent point source is constructed to represent the detailed model at larger distances.<br>We now assume a distribution of such cracks over the source area S, with a certain crack density $C_c$ per source volume from step 1. Hence the point sources calculated as above are also evenly distributed over the source area S with density $C_c$ per source volume. For a more realistic model, the distribution can be randomized, so the average crack density is $C_c$. This model can be expanded to a small number of cracks parallel to include crack interaction. |
| | 3b | Numerical model of an assemblage of many smaller cracks (ND)<br>For this physical concept, analog to a cloud of gas bubbles in water, an oil reservoir consists of an aggregate of smaller cracks. For simplicity, much like for gas bubbles, the cracks are assumed evenly distributed, of the same size. Then we can apply similar assumptions as is done for treatment a set for gas bubbles and determine the combined behavior of the crack assemblage. Analog to bubbles averaging is applied at each location x, so that the several cracks are contained in the averaged volume dV and the averaging volume has properties being representative for a specific location x. It is further assumed that the individual cracks are sensitive to the average pressure field only, not the influence of the neighboring crack. The crack density can't be high for this to hold. This allows applying the results for a single crack directly to the aggregate, using the average properties. |
| | 3c | Numerical model with fluid pillow (ND)<br>This physical concept consists of a fluid-saturated pillow with dimensions derived as follows. The lateral dimensions length L and width W are given by the extent of the source area as estimated from the method 6.1 steps 4a-4e. The thickness d of the pillow is up to the layer thickness (estimated in step 1b). Or the fluid section (d) might be considerably smaller; it could be just a few meters. Information from wells in the general area can be helpful to come up with a reasonable value for this dimension. It could also depend on the structure of an anticline or fault, again specific to the region. The orientation of the fluid pillow could be also vary depending on geometry present (anticline, fault, monocline) and will have to be taken into consideration.<br>There is no existing physical model for the fluid pillow. We establish it by using the equations for elasticity in the solid area, as well as for the solid part in the spongy pillow area, however there with smaller elastic constants (bulk and shear modulus). This accounts for the behavior of the skeleton of the sponge area. The equations for fluids are used for the fluid part in the sponge area (for the first approximation an incompressible and inviscid fluid is used, for higher precision this can be dropped). The equations for fluids are the Continuity equation and Euler's Equation, or Navier Stoke's equations for the latter in case of a viscous fluid. Biot's theory represent this situation best, it allows the fluid pressure to be independent of the outside pressure (so the skeleton carries effectively possibly a large part of the load), and leads to a coupling between the |

| Step | Sub | Description |
|---|---|---|
| | | skeleton and fluid equation in form of an apparent density coefficient $\rho_a$. |
| | | The equation of Biot's theory are: |
| | | $\{\sigma_{ij}\} = 2\mu\{e_{ij}\} + \lambda\{\delta_{ij} \Sigma e_{kk}\} + q\{\delta_{ij} \epsilon\}$ |
| | | $-\beta p = q \cdot \Sigma e_{kk} + r \cdot \epsilon$, where |
| | | $\{\sigma_{ij}\}$ the stress tensor, $\{e_{ij}\}$ the strain tensor and $\mu$ and $\lambda$ Lames constant in the skeleton, p the pressure in the fluid, $\epsilon = \text{div}\{U\}$ the volumetric strain (dilatation) in the fluid and $\beta$ the porosity. It needs to be emphasized that the Lame constants here are not those of the solid, actual values are given e.g. by Geertsma, Trans. AIME Vol. 222, pp. 235,1961. |
| | | Propagation of elastic waves is governed by the equations |
| | | $\mu \nabla^2 \{u\} + (\mu + \lambda) \text{grad}(\Sigma e_{kk}) + q \cdot \text{grad}(\epsilon) = (\rho_s(1-\beta) + \rho_a)\{\ddot{u}\} - \rho_a\{\ddot{U}\}$ |
| | | $\text{grad}(q \cdot \Sigma e_{kk} + r \cdot \epsilon) = (\beta \cdot \rho_f + \rho_a)\{\ddot{U}\} - \rho_a\{\ddot{u}\}$, |
| | | where u the velocity in the solid, U the velocity in the fluid (relative to the solid), $\rho_s$ the density of the skeleton, $\rho_f$ the density of the fluid and denotes the time derivative. The coupling of the essentially elastic equations with the inviscid fluid equations via $\rho_a$ can be clearly seen. |
| | | It follows that the displacement and its derivative need not be identical inside the sponge area for the fluid and elastic equation systems. The difference should be small however. One might need very large effective viscosity for the fluid to account for the flow through the pores (treating the fluid a body of fluid), as this can be modeled only in an average sense. Biot uses the standard viscosity in his theory, however, which adds to the equations above terms depending on the difference between $\partial\{U_i\}/\partial t$ and $\partial\{u_i\}/\partial t$ with a factor $\eta \beta^2/k$, where k is Darcy's permeability. |
| | | For the grid setup a finite element grid (possibly finite difference) will be used. FIG. 10 shows an example for the pillow. To model the pillow area a finer resolution (typical a range from 100 m to 1 km size) is used, with expanded elements further out to constrain reflections. The total grid dimensions are such that several oscillations are possible before reflections arrive from the border of the model at the center. If the depth of the pillow is relatively shallow compared to the size of the pillow, the free surface will be included in the model (see above for determination of dimensions), otherwise a full space is used. |
| | | Boundary conditions: at the earths surface the typical free surface condition is applied, while on the other sides a simulated "non-reflecting" boundary condition should be used. Special boundary conditions apply at the border of the pillow. Displacement and velocity have to be continuous between sponge skeleton and rock. The pressure is also continuous, but inside the sponge, both fluid and skeleton contribute to it. Biot's theory splits the forces on a face unit cube up in one for the skeleton $\{\sigma_{ij}\}$ and on the solid $s = -\beta p$, where p the fluid pressure, $\beta$ the fraction of fluid area on the cube face (= porosity). The pressure p in the fluid is not tied to the face pressure from the solid rock, so that the skeleton can but does not have to hold substantially all of the pressure of the solid rock. Shear stress is continuous between the sponge skeleton and the rock, while the fluid sustains no shear. Disregarding the boundary layer (inviscous), fluid can move along the border, but the normal displacement has to match that of the rock. For a non viscous fluid there can be a non-zero velocity tangential to the border. |
| 4 | | Excitation function for model (NA) |
| | | The excitation function is random noise: |
| | |     a. the character of the random noise can be measured outside the oil, gas or water area, using the same seismometers as for the measurements. This source can be applied to the model. |
| | |     b. (ii) Alternatively the character properties of the random noise can be determined inside the area and used as spectral property for artificial random noise generation. |
| | |     c. (iii) Artificial random noise of a generic type (e.g. Brownian, white noise) can be used for excitation. |
| | | It is assumed that the character of the excitation is approximately the same at the depth of oil or gas area, so that the same excitation can be applied at depth. To account for depths of oil or gas zone, the excitation can be adjusted for amplitude (by use of the square root of the impedance ratio, see step 3 of the method 6.1). One can use point excitation or distributed sources, e.g. on a plane on the side of the noise location (ocean side for oceanic noise). |
| 5 | | Numerical calculation |
| | | Actual numerical calculation with selected model(s). For a detailed model which does not include the surface, the results need to be concentrated at a certain point or points to obtain a representative point source for step 6. |
| 6 | | Numerical model propagation to surface (ST) |
| | | The detailed point source model of step 3a and 3b is now propagated up to the surface in a far field calculation. For step 3c this is applied only for exceptionally large depths. This step assumes that the relevant wave length $\lambda \gg d$ (crack thickness, or pillow thickness), which certainly holds for the frequency range of the oscillations. |
| | | The approach follows again Chouet, 1986. It uses a Greens Function approach. This calculation is done in the frequency domain, which is simpler. The results are computed wave forms at the measurement locations. |

| Step | Sub | Description |
|---|---|---|
| 7 | | Comparing numerical model with measurements (ST) |
| | | From the computed wave forms in form of synthetic seismograms at the measurement locations we can calculate the same parameters as in steps 4a-4e of the method 6.1, using Fourier transform, described statistical processing, time window analysis and Sompi method, and compare them now 1:1 with the measured values. This way agreement and discrepancy can be determined. |
| 8 | | Recheck influence of bubbles in oil or water (ND) |
| | | By the comparison measured against calculated data in step 7 the presence of bubbles can be confirmed or excluded. The importance of the influence of small amount of bubbles in the numerical simulation is stressed once more. It affects the simulation substantially. |
| 9 | | Recheck to verify H/V ratios (ST) |
| | | Making sure such effects are excluded or adjusted for. |
| 10 | | Numerical model refinement (ST) |
| | | The parameters of the model of step 1 can now be readjusted to improve the fit of the calculated values with the measured values at the measurement site. If, after several iterations of steps 2, 5 to 9, a good fit is obtained, we found likely parameters of the oil, gas or water area. If no fit is obtained more radical modification to the model are needed. |
| | | The set of parameters so obtained thus represents the best values for the particular physical concept selected and represents the most detailed description for the fluid/rock combination (porosity, permeability, viscosity, elasticity, parameters of Biot's theory, crack stiffness) and its geometry (L, W, d, $C_c$, $\phi$) available. |
| | | For a test case the differences between the pillow or crack model could allow determining which physical concept is more likely to hold in a particular case. In general only one physical concept is appropriate for a particular situation, and this concept is used for the detailed model. |

6.3 Method of Qualitative Differentiation of Oil, Gas and Water

Area survey for qualitative differentiation between oil, water, gas using a Monte Carlo like approach and mapping strategy, based on differences in frequency and possibly quality Q. The same step 1-4 of the description of the qualitative methods are used, step 5 is modified as follows.

The step numbers correspond to the steps in other sections dealing with the qualitative differentiation of fluids.

| Step | Description |
|---|---|
| 5a | Base physical model (ND) |
| | Interpret the fluid zone as |
| | (i) a system of distributed cracks or as |
| | (iii) a spongy pillow of porous rock. |
| 5b | Dimensions (ND) |
| | The length L and width W for the crack(s) or the pillow dimension can be estimated from the dimensions of the suspect signal areas in the map of step 3. L for cracks may be in the range of 300 to 800 m, possibly smaller (en echelon). It can be further constrained form geological, 2D and 3D seismic evidence. |
| | The thickness of the cracks d can be taken as very small (1:1000-1:10000). Pillow thickness can be best estimated from regional geologic sources, like layer thickness, structure (anticline, fault), existing wells, etc. |
| 5c | Determine parameters of rock which control the crack system or surround the pillow ($\beta$, $\rho_s$). The compressional wave velocity $\alpha$ of the rock may be determined by a standard statistical analysis for field measurements (e.g. following Chouet 1998, Bulletin of Seismological Society, Vol. 88, pages 653 ff.) applied to the set of measurements. Alternatively results of wells or 2D or 3D seismic investigations in the area may be used. The density of rock $\rho_s$ can then be determined from tables in literature, via the type of rock. (ET) |
| 5d | Assume a range of values for parameters of the fluids of interest, oil, water or gas. The range may be constrained by regional geologic evidence, which can give a best estimate of the fluids to encounter. There may be evidence from wells nearby what kind of fluid (gas, oil) is most likely to expect. Determine the density $\rho_f$ and velocity A (or equivalent bulk modulus) with the type of fluid information from tables in literature. The range of values can be used then, assuming locally fixed crack length or pillow dimensions for a Monte Carlo type simulation. For the fluid pillow, estimate likely parameters for the skeleton in the pillow, density $\rho_s$ and a formation velocity c, quality $Q_r$, taking into account the overpressure involved which effectively reduces the influence of the skeleton (see measurement by Gardner, theory of Gassman). |
| 5e | Assess Influence of presence of gas bubbles (ND) |
| | Establish likelihood of free gas phase present from regional properties, depth, type of sediment, possible way oil was generated, age. Estimate the effect on the physical properties determined in 5d (formation velocity c, possibly quality $Q_t$ of fluid/rock combination) for a range (e.g. 0.1%, 1%, 3% bubbles) and likelihood. |

| Step | Description |
|---|---|
| 5f | Oscillation frequency and quality from tables of fluid dynamic research (ND)<br>Determine the main oscillation frequency $v_t$ for water, oil or gas from graphs and tables in Kumagai and Chouet, 2000, or similar, using the determined ratios $\rho_f/\rho_s$ and $\alpha/A$. The subscript $_t$ differentiates the theoretical value of a properties opposed to the non-subscripted measured value of a property. From the theoretical model resonance equation $v = c/2 \cdot \sqrt{N_L^2 + N_w^2/W^2 + N_d^2/d^2}$ determine the frequency; possibly estimate Q via Ocean wave (<1 Hz)/resonance ratio, if correlation is good between Oceanic noise periods and modulation of resonance oscillations.<br>Actual Q can also be obtained by use on/off technique of excitation and applying the Sompi method.<br>Analog research for fluid pillows from our numerical simulations can be used. For cracks evaluate actual frequency $f_t$ from the relation $f = v \cdot \alpha/L$, considering regional variations in length L and velocity $\alpha$. Establish the variation in these frequencies for the assumed fluid value range.<br>Determine quality factor Q of the oscillations in the same way from the graphs and tables. This is generally less helpful, but useful when the Sompi method gives representative Q values. For the fluid pillow model $Q_t$ may be compared to properties of a standard numerical model obtained for the equivalent physical parameters, as a first approximation. It is to expect that the physical parameters have a larger influence than geometry and depth. |
| 5g | Establish trends in map (ND)<br>Work primarily which differences in the map. Trends need to be located in the map of step 3 where differences and absolute values fit the ranges established in step 5f. As long as either of water, oil or gas are located in the same formation, and it's thickness does not vary much, L should be nearly identical in the equation $f = v \cdot \alpha/L$. Hence lower values will tend to be water, higher values oil and gas. If L varies strongly regionally, this needs to be taken into consideration in the mapping, but the differences in frequencies still can be applied.<br>The width at this point of the survey plays a minor role; it may be used for more detailed investigations with a detailed model (method 4.4).<br>The crack thickness d enters only via the crack stiffness $C_R = b/\mu \cdot L/d$, for this phase of investigation it is of minor effect. It is of more significance for the pillow model (data to be established). |
| 5h | Establish from above trends where which type of fluid is likely. Matching from the Monte Carlo range for $f_t$ with f gives the likely fluid present, similarly $Q_t$ with Q, with the limitation of L being involved as well, as discussed in step 5g above. |

6.4 Method of Detailed Model Investigation for Fluid Differentiation (in Area of Interest)

From the survey area, select one or more specific areas to investigate in detail (high areas of signal).

Iterate through steps 2-9 for the qualitative analysis described in method 6.2 above, but with a set of fluid parameters as Monte Carlo approach. The best fitting set needs to be isolated.

The following highlights differences to method 6.2 and important sections in it.

The step numbers are consistent with other sections dealing with quantitative fluid differentiation.

| Step | Description |
|---|---|
| 1 | Initial model parameter estimation (ET)<br>We start with the best values for observed frequency f, compressional rock velocity $\alpha$, dimension $L_{from}$ steps 5, 6 and 10 of the survey investigation 6.3 above.<br>Estimate width W and thickness d, depth h from other information as well, like Geology, 2D and 3D seismics as in step 1 of method 6.3. |
| 2 | Select a likely Monte Carlo range of fluid parameters for the simulation, using the results of method 6.3 as a guide, e.g. a heavy and medium light oil (API 20 and API 30, water, no free gas). Select possibly different skeleton properties for the fluid pillow model, as well hydrostatic overpressure, they apply to the Monte Carlo range as well. |
| 3 | Assess influence of gas bubbles on properties. |
| 4 | Numerical model setup (NA)<br>Select one of the physical concepts for the numerical model:<br>(a) one or several large cracks,<br>(b) assemblage of small cracks,<br>(c) fluid sponge (ND). like in FIG. 10,<br>(d) an alternate or modified concept, better suited for the situation under investigation. |
| 5 | Excitation function for model (NA) |
| 6 | Numerical calculation (ST) |
| 7 | Numerical model propagation to surface (ST) |

| Step | Description |
|------|-------------|
| 8 | Compare with measurement data (ST) |
| | Compare the fit of the measurements with synthetic wave calculations, possibly adjust or confirming some selected basic model parameters (like dimensions, L, W, d, depth h, elastic rock properties) as needed, and redo calculation. |
| 9 | Can influence of bubbles be verified (ND) |
| 10 | Recheck of H/V ratios (ST) |
| 11 | Select most likely combination of parameters out of set of results (ND) |
| | The simulation is similar to method 6.2 in operation, but this time a set of different values for fluids are used, the Monte Carlo range, producing each a set of results as of frequency f and Q values as well. It allows investigating the effect of the Monte Carlo range in detail, rather than just determining the overall behavior of the resonator. The best value in the set which matches measurements most closely, determines which fluid(s) are present. This numerical model allows investigating the effect of different fluids in detail, and discriminates between fluids more precisely, than the qualitative method 6.3. |

7. Description of Drawings

FIG. 1: Schematic picture of oil accumulating below a cap-rock (impermeable rocks, like shale, which tend to fracture less due to more ductile behavior, dashed signature), with a distributed fracture system present below the cap-rock in the reservoir formation. Most likely oil migrates (dotted arrows) from the source formation along fractures, and porous sections of rocks connecting between them, until it gets trapped below the cap rock. As long as a conduit of some kind is present between the original formation of the oil and the accumulation fluid pressure will be higher than hydrostatic pressure under the cap-rock. This tends to open the cracks slightly. This over-pressure will help to make this open crack system to resonate when seismic waves pass through, at its characteristic resonance frequency. Over-pressure also results because of the higher weight of the overburden of the heavier rock than oil. Resonance occurs in form of surface waves along the crack boundary.

FIG. 2: Schematic representation of an oil-saturated pillow in porous sandstone (dotted). The oil migrated along a porous conduit from the original host rock to the trap, made up by cap rock (dashed) and a structure (faults or folds). As long as not all the oil has migrated to the trap, hydraulic pressure below the trap is normally higher than ambient hydrostatic pressure. Additional over-pressure can also result because of the higher weight of the overburden of the rock heavier than oil. The oil can effectively carry part of the structure. This generates a situation somewhat similar to liquefaction in unconsolidated rock when seismic waves pass through, leading to amplification of seismic waves due to resonance in the oil pillow.

FIG. 3: Effect of fractional volume of gas bubbles β (in %) on the acoustic velocity of oil mixture $c_m$ (in m/s) as a function of depth (in m). At atmospheric pressure the velocity of oil is about 1300 m/s, it drops very rapidly even for small percentages to lower values than even gas alone, and rises slightly only for nearly pure gas again. The physical model assumption may not hold at the limit of nearly all gas, but this situation is not relevant for the purposes of this patent.

It is clearly seen that small amount of gas bubbles have a very strong impact on the impedance.

FIG. 4: Situation for a fluid pillow of length L, width W and thickness d with of oil in the earth in the coordinate system x, y, z is shown. Below it is the idealization of a single frequency component of the noise source in form of a locally plane wave. The noise is made up of many of such components. The impinging wave vector k of this plane wave is broken up into components normal to the faces of the pillow. These are the only parts playing a nonzero role in an in-viscous fluid.

The impinging wave component for the y direction on the pillow is shown on the left as the excitation wave of pressure $p_e$ (shorter solid arrow) and moving past the pillow to the right (long solid arrow). The resulting traveling waves inside the pillow bouncing back (pressure $p_l$) and forth ($p_r$) are shown as dashed arrows. For the resonance frequency they constructively add to build a standing wave ($p_s$) as shown symbolically above arrows. The resulting pressure for this free oscillation is shown as a dashed curve, the particle velocity as a dotted curve. For simplicity no energy leakage to the outside is assumed.

FIG. 5: Equations for amplitude of free oscillation of an idealized fluid enclosure. The first line shows the construction, consisting of n bouncing waves from two sides, with resulting pressure ratio p to excitation $p_e$, as a function of frequency We and phase of an applied coherent noise component as described in FIG. 4. Only wave contributions from one side are shown for simplicity. The following lines show resulting explicit formula, which encompasses 2 pages, of which just starting and ending lines are shown for space reason. The figure below shows graphically the numerical results as a function of the excitation frequency We and phase for specific numeric values of the other parameters (velocities, pillow dimension and attenuation) as stated in the text.

Figure 7:
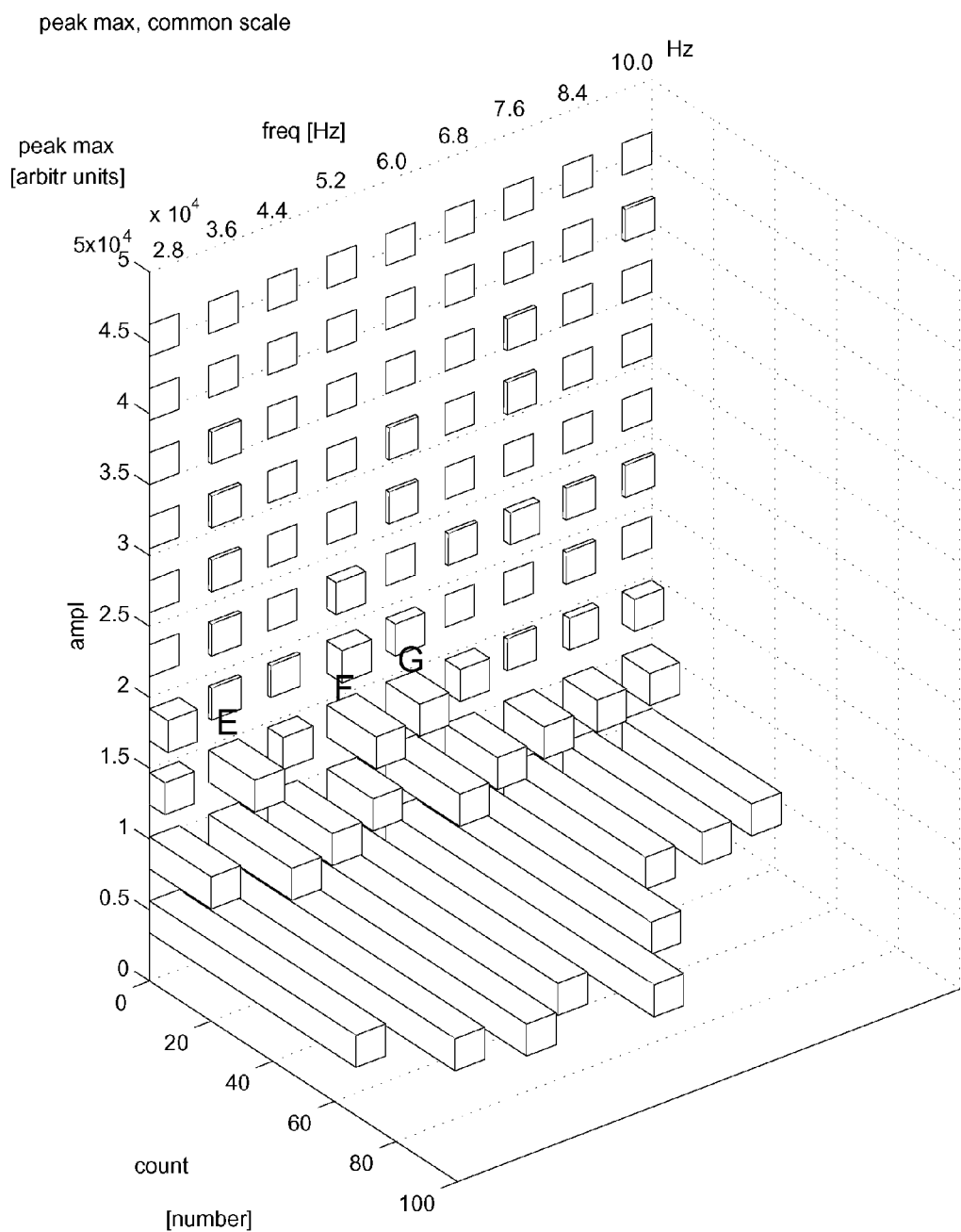
Figure 8:
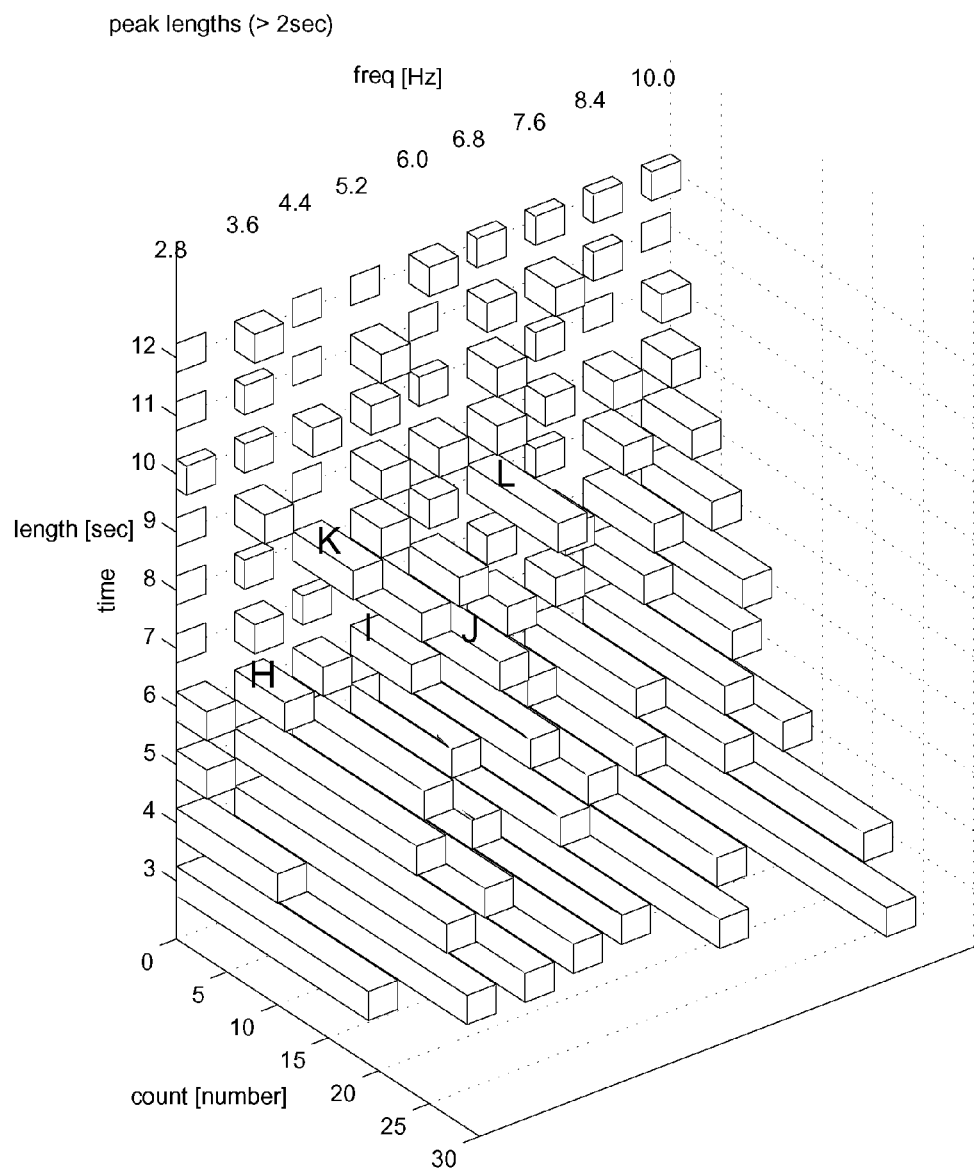
Figure 9:
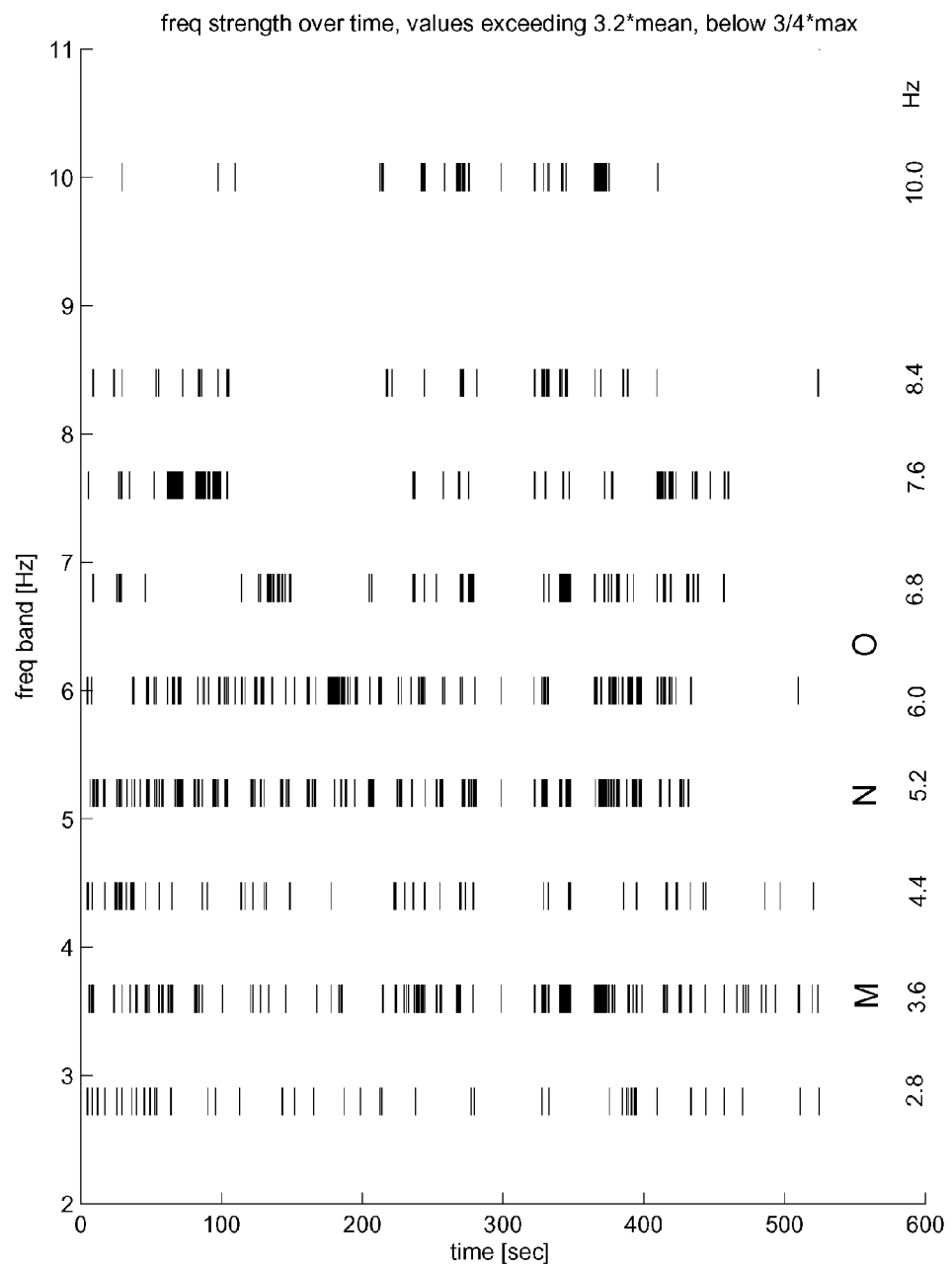

The purpose of FIGS. 6 to 8 is to illustrate how to obtain information about potential oscillators out from the noise in the recorded signal.

The noise can be characterized as follows: there is regular low-key, background noise, usually Brownian noise.

There are also local, sporadic, often strong noise sources, like wind gust, traffic or animals etc.

It is best to characterize the noise with nearby with measurements where no oil is suspected.

In the present case histograms of characteristic noise show a fast exponential decay in peak lengths. Local, sporadic high noise is excluded by not considering it in the evaluation.

Oscillation sources stand out from noise by differences in statistics, as to have a slower decay than regular noise, or high values at specific places than average noise.

FIG. 6: Example of time variation of Fourier spectrum peaks for 9 frequency bands for a time period of 80 sec. In the time space, for window lengths of 3 sec, in steps of 1.5 sec, the Fourier spectrum is calculated. The resulting time series of spectra are then divided into frequency bands of 0.8 Hz bands centered at 2.8 Hz, 3.6 Hz, etc up to 10 Hz, at intervals of 0.8 Hz. The amplitude peak in each band and for each time is selected and plotted, resulting in a ribbon of amplitude peaks in time for each band as shown.

Characteristic for standard noise is a normal range of amplitudes of primarily short duration, therefore the short duration contributions are most visible. Local noise not eliminated (e.g. wind, traffic) will show up as short bursts of high amplitude (marked D).

An oscillation would show up as a rising amplitude peak followed by decay, with a longer persistent time scale than regular noise. Such oscillations can be observed, e.g. at the front of the 2.8 Hz, 3.6 and 5.2 Hz ribbon (marked A and B, C). Ideally such peaks should also be higher than regular noise.

To visualize this more clearly, further statistical analysis is needed, see following figures.

FIG. 7: Peak maximum statistics in form of a histogram for the time variation of the Fourier spectrum peaks for frequency bands at 2.8, 3.6, etc. to 10 Hz (0.8 Hz interval), obtained as described in FIG. 6. In the case shown, a common scale for all histograms is used.

General noise is characterized by a maximum count at high amplitudes with a quick drop off count toward lower amplitudes. For oscillation resonance, the peak histogram should have a larger spread than observed for noise. This can be clearly seen at 3.6 and 5.2 Hz (marked as E and F) and somewhat at 6.0 Hz (marked as G), where at an amplitude of $1.5 \cdot 10^4$ a considerably larger number peaks is observed than at other frequency bands.

FIG. 8: Peak duration (length) statistics in form of a histogram for the time variation of the Fourier spectrum peak lengths for frequency bands at 2.8, 3.6, etc. to 10 Hz (0.8 Hz interval), obtained as described in FIG. 6. In the case shown, common scaling of the bands is also used. Only longer durations (>2 sec) are selected to emphasize more clearly the influence of longer durations. Durations with a slower count drop-off can be recognized for 3.6, 5.2 and 6.0 Hz (marked H, I and J), like detected in FIG. 7, indicating oscillators.

There are interesting large counts of durations of 8 sec at 4.4 and 6.8 Hz (marked K and L). These durations form a local maximum by them selves; they are not part of the smooth count drop-off in the curve. On the peak maximum histogram using individual scaling (not shown) they show up also with a slow drop off typical for oscillations. Their power overall is smaller however, as can be seen from FIG. 7 for these frequencies. They possibly could constitute a persistent oscillator at a deeper depth, with the 2 values representing length and width of the zone. A quantitative analysis should be used to gain more details.

FIG. 9: Frequency strength time plot for a 10 min interval. The peak strength (maximum) is determined as described in FIG. 6 and plotted as function of time for the same frequency bands. For clarity only levels higher than 3.2× the overall mean value are plotted as a same width tick (none if level is below), excluding extreme values near the maximum (probably due to sporadic local noise). At this level contributions start to thin out and the stronger contributors emerge. The strong bands standing out are at 3.6 and 5.2 Hz, with a possible at 6.0 Hz (marked M, N and O). These are the same bands already showing oscillator indications in FIG. 5 through 8, reinforcing oscillator assignment to these bands. This type of diagram is useful to find quickly the highest contributors.

FIG. 10: Grid design for numeric simulations for the fluid filled sponge in form of a pillow. Shown is only the pillow outline for clarity. The region inside the pillow contains the skeleton and oil, the area outside just rock. The pillow is located at a selectable position inside the main grid in the form of a large block (not shown). The upper surface of the main grid can be the free surface of the earth.

Size and number of elements forming the pillow can be adjusted as required by the simulation. This example shows a course setup for clarity. Element types involved are blocks, wedges and tetrahedras, the latter occur because of the tapered edges of the pillow. The top half of pillow is outlined in dark, the bottom half is light.

What is claimed is:

1. A qualitative method to locate and dimension a fluid saturated zone in the earth, said fluid consisting of oil, gas and water, by extracting characteristic resonance response of said zone in the range of 1-20 Hz to ambient noise, said method comprising the steps 1.1. perform seismic measurements, over a survey area, where oil, gas and water are suspected or searched for, with long period seismometers for certain time duration each, measuring done
in successive manner or
in arrays,
said measuring seismic energy produces seismograms, spacing between seismometers chosen not larger than wave length of interest, performing a few reference seismic measurements where fluid is not present in the survey area, and performing a continuous seismic measurement to monitor signal variation in time, said seismometers placed away from local noise and buried to avoid wind, 1.2. while performing said seismic measurements, passively exciting said fluid saturated zone into resonance by seismic noise in the earth, the excited fluid saturated zone constituting fluid related oscillators, 1.3. correct said seismograms for local impedance changes, effect of topography and geological differences, regional noise patterns and possible tidal effects, 1.4. perform a main signal analysis of said seismograms in the frequency domain, by a computer executing computer programs, to (a) define behavior of average signal frequency and average signal phase of said seismic measurements over the entire duration of said seismic measurements, and also process said seismograms
to obtain regional velocity correlation coefficients,
to derive from said regional velocity correlation coefficients a corresponding velocity dispersion, under the assumption of random surface waves,
to determine velocity as a function of depth by inverting said velocity dispersion, based on main mode surface wave dispersion, (b) use a horizontal/vertical component ratio test in said seismograms to exclude rock only oscillations, related to rock layering and rock structures alone and unrelated to said fluid saturated zone, said rock only oscillations are excluded from further consideration and optionally filtered out, (c) examine signal character of said seismograms within standard seismic noise
with shifted time windows, 1.5-30 sec size, to determine signal frequency peaks in said frequency domain, characterizing said fluid related oscillators, with signal frequency peak characteristics
signal frequency peak amplitude,
signal frequency peak sharpness,
signal frequency peak duration,
optionally phase behavior of signal frequency peaks,
signal frequency peak repetitiveness,
identifying said signal frequency peaks within standard seismic noise by use of a frequency/time/strength plot and optionally filter said seismograms by using a signal frequency range based on said signal frequency peaks for further processing, and
(d) use Sompi method on said seismograms, with or without said optionally filtering, to determine prevalent—if any—oscillator frequency f and oscillator quality Q of said fluid related oscillators,
(e) correlate shape and amplitude of signal of said seismograms to a depth indicator; more smoothness in said shape and amplitude of signal indicates more depth,
(f) map strong seismic signals
said average signal frequency from (a),
said signal frequency peaks from (c),
said oscillator quality Q from (d),
said depth indicator over said survey area,
(g) set up and use statistics in time and space of
said oscillator frequency f,
said oscillator quality Q,
said depth indicator,
said signal frequency peaks
for comparisons between different areas, where additional details are known:
depth of said fluid saturated zone,
fluid type,
dimensions of said fluid saturated zone,
to deduce additional physical or geometrical properties of said fluid saturated zone.

2. The method of claim 1, wherein to determine preliminary physical properties of said fluid saturated zone, performing steps consisting of
2.5a) estimating potential fluid related oscillator model properties of said fluid related oscillator via alternate information, said oscillator model properties consisting of
dimensions of strong signal areas from said mapping,
thickness and material type of said fluid related oscillator from available regional geology, seismic surveys, geophysical data sources,
fluid properties—density, fluid velocity from regional data, and
2.5b) transforming said fluid related oscillator model properties over to hypothetical fluid related oscillator frequency $f_T$ and quality $Q_T$ by use of
(i) tables and graphs from fluid-mechanic models from volcanology, applied to oil exploration,
(ii) formulas and graphs from a theoretical pillow model, or
(iii) tables and graphs from numerical pillow models,
2.5c) considering the effect of a fraction of gas present as bubbles on said hypothetical fluid related oscillator frequency $f_T$ and quality $Q_T$,
2.5d) comparing said oscillator frequency f and quality Q and said signal frequency peaks with said hypothetical fluid related oscillator frequency $f_T$ and quality $Q_T$
2.5e) performing said estimation, transforming, and comparing operations until Q and $Q_T$, and f and $f_T$ are close in value, to establish a best said estimate.

3. The method of claim 2 comprising further performing a numerical model analysis done on a specific sub-area of interest, comprising the steps
5.1. estimating starting model parameters
thickness d of said fluid saturated zone,
crack orientation φ and crack density Cc
depth of said fluid saturated zone H,
properties of rocks and
fluid velocity, fluid density, fluid impedance, fluid viscosity,
porosity, permeability related to fluid,
length L of said fluid saturated zone,
width W of said fluid saturated zone and
multiple/single fluid saturated zones,
by
strong seismic signal areas in said mapping
from geologic information,
2D-3D seismic investigations,
wells data and
said preliminary physical properties of said fluid saturated zone,
5.2. determining a mixture velocity cm of fluid and gas bubbles, by estimating bubble volume % from regional data,
5.3. setting up a numerical model for said numeric model analysis, by specifying
a physical characteristic based on said fluid saturated zone,
a finite difference grid or a finite element grid based on said physical characteristic,
Biot's theory or Gassman's theory, using coupled equations of elasticity and fluid,
5.4. applying a seismic excitation to said numerical model at selected grid points, after migrating said seismic excitation to a depth corresponding to said fluid saturated zone, said seismic excitation determined by
measured random seismic noise outside of said fluid saturated zone,
simulated random seismic noise from measured seismic noise characteristics in the survey area or
theoretical seismic noise,
5.5. calculating velocity or displacement response of said numerical model as a function of time, and concentrating said velocity or displacement response at one, or more selected point(s), so obtaining the characteristics of a single point source or distribution of point sources,
5.6. migrating said single point source or said distribution of point sources, to the surface of the earth by use of Greens function approach, resulting in synthetic waveforms,
5.7. determining a signal fit, alternatively a Fourier-transformed signal fit, between said synthetic waveforms and said seismograms at corresponding locations, and adjusting said starting model parameters as needed to improve said signal fit, to produce a better fit of said synthetic wave form with said seismograms in said comparison,
5.8. determining presence of gas bubbles based on said signal fit,
5.9. checking horizontal/vertical ratios in said synthetic waveforms to exclude oscillations generated by rock only structures or layering,
5.10. repeating said steps 5.5 to 5.9 using said adjusted starting model parameters, till an optimal signal fit between said synthetic waveforms with said seismograms at corresponding locations results, so obtaining a best set of model parameters consisting of said adjusted starting model parameters.

4. The method of claim 3, wherein selecting one physical characteristic for the fluid saturated zone from a plurality of physical characteristics a) to c), depending on available geophysical and geological information:
a) at least one fluid filled fracture of length L in range of 100s of meters or parallel and regularly distributed fluid filled fractures of length L in range of 100s of meters, specified by crack dimension, and crack stiffness $C_K$, b) small fluid filled cracks of size 10 m range or less in a given volume, said cracks forming a cloud of cracks, specified by average physical properties for said given volume, c) a porous sponge pillow containing fluid, specified by pillow dimensions and physical properties based on Biot's theory or Gassman's theory, said fluid potentially over-pressurized.

5. The method of claim 1, comprising an analysis performing a theoretical fluid pillow model, consisting of
   9.5a) estimating an effective velocity c of fluid saturated rock via Gassman's theory, under appropriate hydrostatic overpressure in fluid, 9.5b) inserting frequency of said fluid related oscillators into resonance frequency equation $$v = c/2\sqrt{N_L^2/L^2 + N_W^2/W^2 + N_d^2/d^2}$$

of said theoretical fluid pillow model, where N refers to oscillation modes, to determine dimensions length L, width W, thickness d of said theoretical fluid pillow model.

6. A method to locate and dimension a fluid saturated zone in the earth, consisting of combinations of oil, gas and water, by extracting characteristic resonance response of said fluid saturated zone in a range of 1-20 Hz from observed ambient noise, said method comprising the steps
   11.1. select a survey area and make measurements of seismic energy with suitable seismometers for said frequency range, resulting in seismograms, while a fluid saturated zone is passively excited by seismic noise in the earth, said excited fluid saturated zone constituting a fluid related resonator,
   11.2. correct said seismograms for local conditions,
   11.3. perform a main analysis of said seismograms in the frequency domain, by a computer executing computer programs, to
      (a) define behavior of average signal frequency and signal phase in said seismograms, in time and space, of said fluid related resonators, and also derive a velocity dispersion of random surface waves from said seismograms, inverting said velocity dispersion to velocity as a function of depth, said inversion based on main modes of surface waves,
      (b) use a horizontal to vertical maximum ratio test in said seismograms to exclude oscillations related to rock layering and rock structures alone,
      (c) examine said seismograms with shifted time windows of 1.5-30 sec, to determine signal frequency peaks, optionally including signal phase behavior, use repetitiveness of said signal frequency peaks to isolate said signal frequency peaks as deviations in statistics from standard noise, also isolate said signal frequency peaks by use of a frequency/time/strength plot,
      (d) use Sompi method on said seismograms to determine, said fluid related resonator, if any, with fluid related resonator frequency f and fluid related resonator quality Q,
      (e) correlate shape and amplitude roughness of signal around the signal frequency peaks in said seismograms to a depth indicator, more smoothness of signal indicating greater depth,
      (f) map said behavior of average signal frequency from (a), said signal frequency peaks from (c), said fluid related resonator frequency f and fluid related resonator quality Q from (d), said depth indicator from (e) over the survey area, thereby identifying suspect signal areas, and
      (g) compare data of fluid related resonator under investigation, said data consisting of
         said fluid related resonator frequency f and said signal frequency peaks
         said fluid related resonator quality Q,
         said depth indicator,
      to equivalent data of fluid related resonator in areas where and physical properties of said fluid related resonator are known, to deduce said physical properties under investigation,
   11.4. relate said signal frequency peaks, said fluid related resonator frequency f and fluid related resonator Q to model data frequency $f_T$ and model data quality $Q_T$, either theoretical or numerical model type, to preliminarily identify physical properties of said fluid related resonator,
and identifying and preliminarily defining said fluid related resonator due to said fluid saturated zones.

7. The method of claim 6, wherein said model data frequency $f_T$ and model data quality $Q_T$ are obtained by
   12.5a) estimating associated hypothetical numerical resonator model properties
      resonator dimensions: length, width, thickness,
      resonator rock type, and
      resonator fluid properties
   via
      alternate regional,
      geological and
      geophysical information
      as well as said mapping,
   12.5b) considering the effect of a fraction of gas present as bubbles on $f_T$ and $Q_T$.

8. The method of claim 7, further comprising performing a numerical model analysis, applied to a specific sub-area of interest, to determine location and properties of said fluid saturated zone in the earth,
   15.1. estimating starting model parameters
      properties of rocks and
      properties of fluids,
      extent of fluid saturated zone,
   by
      geologic information,
      seismic investigations,
      wells,
      said main analysis of said seismograms and
      said preliminarily identifying physical properties of the fluid related resonator,
   15.2. estimating an effect of presence of gas bubbles on said starting model parameters,
   15.3. implementing a numerical model for said numerical model analysis, based on a physical characteristic for said fluid saturated zone, using a finite difference or finite element grid, using coupled equations of elasticity and fluid,
   15.4. applying a seismic excitation function, based on measured or random seismic noise, as excitation input to said numerical model, at selected grid points,
   migrating said seismic excitation function to depth based on location of said fluid saturated zone,
   15.5. calculating seismic response of the said numerical model as a function of time, and concentrating said seismic response at one or more selected point(s) to obtain a distribution of point sources,
   15.6. determining response of said distribution of point sources to the surface of the earth where needed due to large depths, by use of a Green's function approach, producing synthetic seismograms, 15.7. determining a signal-fit between said synthetic seismograms and said seismograms at corresponding locations, optionally processing said synthetic seismograms and said seismograms by a Fourier transform, and adjusting said starting model parameters to obtain a better signal-fit between said synthetic seismograms and said seismograms, 15.8. concluding or excluding potential presence of gas bubbles based on said signal-fit, 15.9. testing said synthetic seismograms to identify oscillations generated by rock only structures, 15.10. repeating said steps 15.5 to 15.9 using said adjusted starting model parameters, till an optimal signal-fit between said synthetic seismograms and said seismograms results, obtaining a best set of model parameters based on said adjusted starting model parameters.

9. The method of claim 8, wherein selecting a physical characteristic of said fluid saturated zone from a plurality of physical characteristics, depending on available geophysical and geological information, wherein there is a) at least one fluid filled crack or parallel and regularly distributed fluid filled cracks, specified by crack dimensions and crack stiffness $C_K$, b) small fluid filled cracks in a volume forming a cloud, specified by physical properties for said volume containing the small cracks, c) a single porous sponge pillow model containing fluid, said fluid potentially being over-pressurized, specified by physical parameters of rock, fluid and fluid skeleton, and pillow dimension.

10. The method of claim 8, further comprising applying of a Monte Carlo approach to said numerical model analysis by specifying a Monte Carlo range for fluid section of said starting model parameters, corresponding to fluids to be differentiated, said best set of model parameters representing a most probable fluid.

11. The method of claim 6 comprising in addition performing an array analysis of said seismograms, by a Seismic Analysis Code computer program, consisting of calculating a strongest signal source contribution due to said fluid related resonator, and calculating a direction of said strongest signal source contribution due to said fluid related resonator.

* * * * *